US010929789B2

(12) United States Patent
Matsui et al.

(10) Patent No.: US 10,929,789 B2
(45) Date of Patent: Feb. 23, 2021

(54) INFORMATION PROCESSING METHOD, INFORMATION PROCESSING SYSTEM, AND RECORDING MEDIUM STORING PROGRAM

(71) Applicant: Panasonic Intellectual Property Corporation of America, Torrance, CA (US)

(72) Inventors: Shuhei Matsui, Osaka (JP); Naoyuki Harada, Osaka (JP); Hideo Umetani, Osaka (JP); Takuya Yamaguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 429 days.

(21) Appl. No.: 15/955,755

(22) Filed: Apr. 18, 2018

(65) Prior Publication Data

US 2018/0374014 A1 Dec. 27, 2018

(30) Foreign Application Priority Data

Jun. 26, 2017 (JP) .............................. JP2017-124438
Jan. 29, 2018 (JP) .............................. JP2018-012685

(51) Int. Cl.
  *G06Q 10/00* (2012.01)
  *G06Q 10/06* (2012.01)
  (Continued)

(52) U.S. Cl.
  CPC ..... *G06Q 10/06311* (2013.01); *G06Q 10/047* (2013.01); *G06Q 50/30* (2013.01);
  (Continued)

(58) Field of Classification Search
  None
  See application file for complete search history.

(56) References Cited

U.S. PATENT DOCUMENTS 5,508,931 A * 4/1996 Snider .................... G01C 21/30
  701/446
6,459,986 B1 * 10/2002 Boyce ................ G01C 21/3438
  701/465
(Continued)

FOREIGN PATENT DOCUMENTS

JP    2005-091249 A    4/2005
WO    2014/002267      1/2014

OTHER PUBLICATIONS

Javier Alonso-Moraa, Samitha Samaranayakeb, Alex Wallara, Emilio Frazzolic, and Daniela Rusa (On-demand high-capacity ridesharing via dynamic trip-vehicle assignment, 462-467, PNAS, Jan. 17, 2017, vol. 114, No. 3). (Year: 2017).*

(Continued)

*Primary Examiner* — Hafiz A Kassim
(74) *Attorney, Agent, or Firm* — Greenblum & Bernstein, P.L.C.

(57) ABSTRACT

An information processing method enhancing running efficiency of a passenger transportation vehicle is provided. The information processing method includes acquiring first stop position information indicating a first desired stop position of a first user riding a vehicle and tolerable range information indicating a gap range from the first desired stop position, which the first user tolerates, acquiring second stop position information indicating a second desired stop position of a second user riding the vehicle, deciding the second route based on the first stop position information, tolerable range information, and second stop position information, transmitting an inquiry of whether the second route is approved to an apparatus controlled by the first user, or assigning a benefit or the cost to the first user in a case of receiving a response indicating that the second route is approved or not approved from the apparatus.

17 Claims, 12 Drawing Sheets

(51) Int. Cl.
*G06Q 10/04* (2012.01)
*G06Q 50/30* (2012.01)
*G08G 1/127* (2006.01)
*G08G 1/137* (2006.01)
*G08G 1/00* (2006.01)

(52) U.S. Cl.
CPC ............. *G08G 1/127* (2013.01); *G08G 1/137* (2013.01); *G08G 1/202* (2013.01)

(56) References Cited

U.S. PATENT DOCUMENTS

| | | | | |
|---|---|---|---|---|
| 7,840,427 | B2* | 11/2010 | O'Sullivan | G06Q 10/02 |
| | | | | 705/6 |
| 8,126,601 | B2* | 2/2012 | Kapp | G01C 21/00 |
| | | | | 701/20 |
| 9,562,785 | B1* | 2/2017 | Racah | G01C 21/3438 |
| 10,636,230 | B1* | 4/2020 | Laranang | G06F 3/0482 |
| 2006/0059023 | A1* | 3/2006 | Mashinsky | G06Q 10/02 |
| | | | | 705/5 |
| 2006/0242154 | A1* | 10/2006 | Rawat | G06F 16/168 |
| 2009/0216600 | A1* | 8/2009 | Hill | G06O 50/30 |
| | | | | 705/7.14 |
| 2012/0034910 | A1* | 2/2012 | Fang | H04W 28/16 |
| | | | | 455/422.1 |
| 2012/0041675 | A1* | 2/2012 | Juliver | G06Q 30/0283 |
| | | | | 701/465 |
| 2015/0054647 | A1* | 2/2015 | Edwards | G08B 21/22 |
| | | | | 340/568.1 |
| 2015/0142485 | A1* | 5/2015 | Kiyama | G08G 1/0112 |
| | | | | 705/7.11 |
| 2015/0161533 | A1* | 6/2015 | Kawamoto | G06Q 50/30 |
| | | | | 705/7.12 |
| 2015/0254581 | A1* | 9/2015 | Brahme | G06F 16/29 |
| | | | | 705/5 |
| 2015/0310378 | A1* | 10/2015 | Van Der Berg | G06Q 50/30 |
| | | | | 705/7.15 |
| 2016/0370194 | A1* | 12/2016 | Colijn | G01C 21/343 |
| 2017/0059334 | A1* | 3/2017 | Mukherjee | G01C 21/3492 |
| 2017/0169366 | A1* | 6/2017 | Klein | G06Q 50/30 |
| 2017/0169535 | A1* | 6/2017 | Tolkin | G06Q 10/06311 |
| 2017/0270447 | A1* | 9/2017 | Borean | G06Q 10/06313 |
| 2017/0270794 | A1* | 9/2017 | Sweeney | G08G 1/143 |
| 2017/0364968 | A1* | 12/2017 | Gopalakrishnan | ............. |
| | | | | G06Q 30/0283 |
| 2017/0365030 | A1* | 12/2017 | Shoham | G06Q 10/02 |
| 2018/0135993 | A1* | 5/2018 | Thangaraj | H04L 67/18 |
| 2018/0156623 | A1* | 6/2018 | West | G01C 21/3423 |
| 2018/0208199 | A1* | 7/2018 | Fujita | G08G 1/166 |
| 2018/0283885 | A1* | 10/2018 | Peterson | G01C 21/3438 |
| 2020/0112835 | A1* | 4/2020 | Li | G06Q 30/0261 |

OTHER PUBLICATIONS

M. Paz Linares, Lídia Montero, Jaume Barceló, Carlos Carmona (A Simulation Framework for Real-Time Assessment of Dynamic Ride Sharing Demand Responsive Transportation Models, 2016 IEEE)). (Year: 2016).*
The Extended European Search Report dated Aug. 3, 2018 for the related European Patent Application No. 18176740.1.
Communication pursuant to Article 94(3) EPC dated Jul. 28, 2020 for the related European Patent Application No. 18176740.1.

* cited by examiner

INFORMATION PROCESSING METHOD, INFORMATION PROCESSING SYSTEM, AND RECORDING MEDIUM STORING PROGRAM

BACKGROUND

1. Technical Field

The present disclosure relates to an information processing method and so forth for performing allocation of a vehicle.

2. Description of the Related Art

In related art, an apparatus or the like has been disclosed which creates a running schedule of an on-demand vehicle (shared vehicle) based on demands from plural users and manages the running of the on-demand vehicle in accordance with the created running schedule (for example, Japanese Patent No. 5928588). For example, the apparatus accepts desired vehicle allocation times by plural users and ranges of tolerable time gaps with respect to the desired times. Accordingly, the number of persons who may be transported by one on-demand vehicle increases, and a profitable running schedule may thereby be created. Further, the user may gain a benefit (reward) that corresponds to the gap width from the desired time.

SUMMARY

Incidentally, in a case where a passenger transportation vehicle such as a shared vehicle is administered while sequential reservations are accepted and the passenger transportation vehicle attempts to correctly arrive at a designated destination (riding position or getting-off position) for each user, a detour, an extra round trip, or the like may occur. Such a running method causes a delay in an arrival time to the destination for the user and meanwhile causes a lowering in the profitability for one vehicle for a provider of the passenger transportation vehicle or an increase in energy consumption, resulting in lowering in the running efficiency.

One non-limiting and exemplary embodiment provides an information processing method and so forth that may enhance running efficiency of a passenger transportation vehicle.

In one general aspect, the techniques disclosed here feature an information processing method including: acquiring first stop position information that indicates a first desired stop position for riding or getting-off of a first user who rides a vehicle and tolerable range information that indicates a range of a gap from the first desired stop position, the range which is tolerated by the first user; acquiring second stop position information that indicates a second desired stop position for riding or getting-off of a second user who rides the vehicle; deciding a second route based on the first stop position information, the tolerable range information, and the second stop position information; transmitting an inquiry of whether or not the second route is approved to an apparatus that is controlled by the first user; and assigning a benefit to the first user in a case where a response that indicates that the second route is approved is received from the apparatus that is controlled by the first user or assigning a cost to the first user in a case where a response that indicates that the second route is not approved is received from the apparatus that is controlled by the first user.

An information processing method and so forth according to the present disclosure may enhance running efficiency of a passenger transportation vehicle.

It should be noted that general or specific embodiments may be implemented as a system, an apparatus, a method, a recording medium, a computer program, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
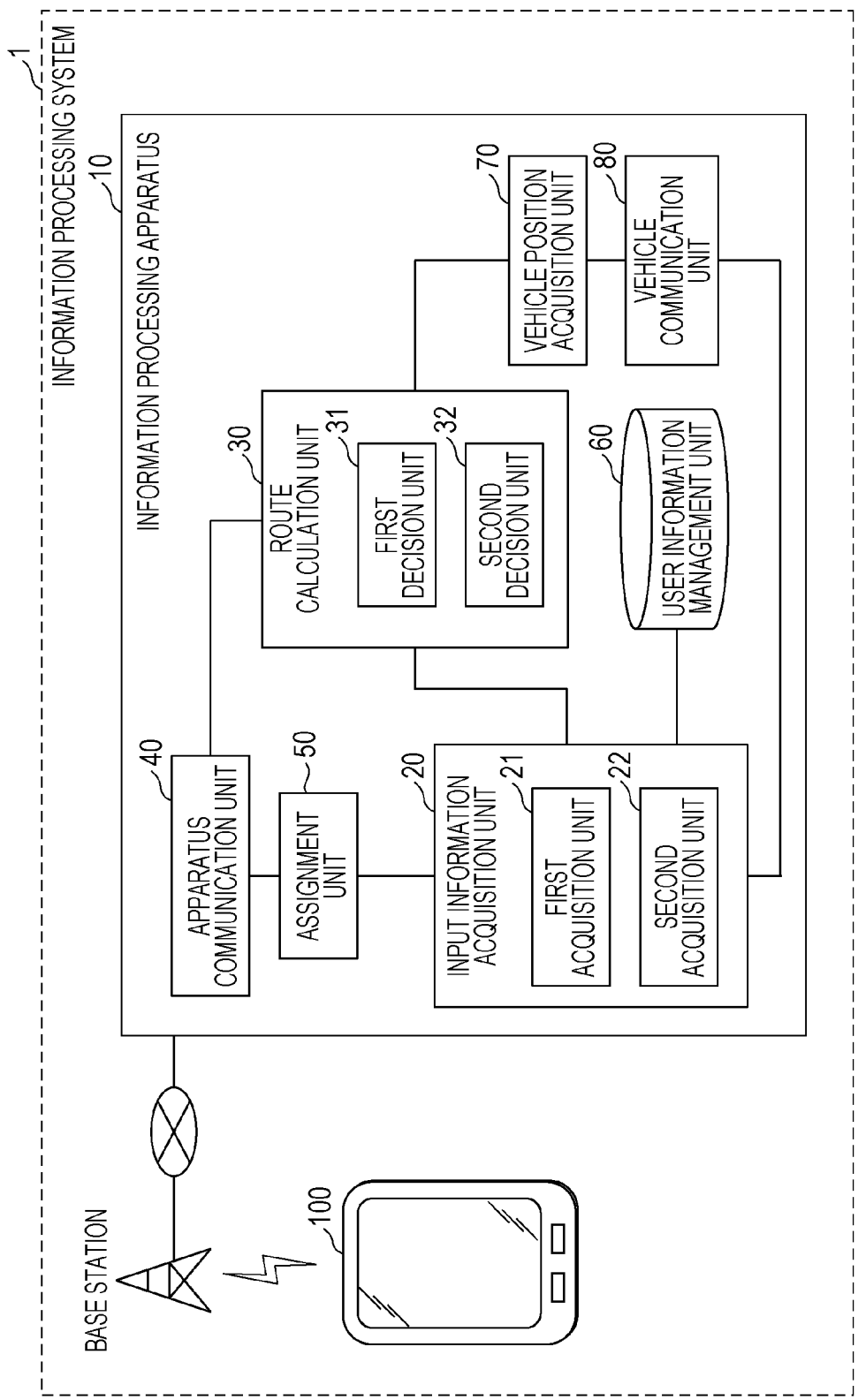
FIG. 1 is a block diagram that illustrates one example of a configuration of an information processing system in an embodiment.

An information processing method of the present disclosure is an information processing method including: acquiring first stop position information that indicates a first desired stop position for riding or getting-off of a first user who rides a vehicle and tolerable range information that indicates a range of a gap from the first desired stop position, the range which is tolerated by the first user; acquiring second stop position information that indicates a second desired stop position for riding or getting-off of a second user who rides the vehicle; deciding a second route based on the first stop position information, the tolerable range information, and the second stop position information; transmitting an inquiry of whether or not the second route is approved to an apparatus that is controlled by the first user; and assigning a benefit to the first user in a case where a response that indicates that the second route is approved is received from the apparatus that is controlled by the first user or assigning a cost to the first user in a case where a response that indicates that the second route is not approved is received from the apparatus that is controlled by the first user.

For example, the path to the second desired stop position may be shortened in a case where a passenger transportation vehicle (hereinafter also referred to as vehicle) does not travel via the first desired stop position (first route). In such a case, in a case where the stop position for the first user is changed within the range of the gap that is tolerated by the first user and the passage of the second route in which the path to the second desired stop position is shortened is admitted, running efficiency of the vehicle may be enhanced. However, in a case where the vehicle passes the second route, the stop position becomes off from the first desired stop position of the first user. However, because the benefit is assigned to the first user in a case where the second route is approved or the cost is assigned to the first user in a case where the second route is not approved by the first user, the second route is more likely to be approved by the first user, and the running efficiency of the passenger transportation vehicle may thereby be enhanced.

The enhancement of the running efficiency of the passenger transportation vehicle provides significant effects for both of the user and a provider of the passenger transportation vehicle. For example, the user (second user) may make the riding time or getting-off time earlier, and the user (first user) may gain the benefit. For example, for the provider, the number of persons who may be transported for one vehicle increases, and the fuel consumption amount of the vehicle may be decreased.

Further, an approval for the second route may include selection from the plural second routes. In this case, choices may be given to the user, and running with a desirable route for the user becomes possible. In addition, the selection of the second route may include selection of a position on the second route. In this case, the riding and getting-off positions may be designated by the user, and riding and getting-off in desirable positions for the user becomes possible.

Further, the first desired stop position may be a position for getting-off of the first user, and the second desired stop position may be a position for riding of the second user.

Accordingly, because the second route in which a desired getting-off position of the first user as the first desired stop position is changed is approved and the path to a desired riding position of the second user as the second desired stop position is thereby shortened, the running efficiency of the passenger transportation vehicle may be enhanced.

Further, the first desired stop position may be a position for getting-off of the first user, and the second desired stop position may be a position for getting-off of the second user.

Accordingly, because the second route in which the desired getting-off position of the first user as the first desired stop position is changed is approved and the path to the desired getting-off position of the second user as the second desired stop position is thereby shortened, the running efficiency of the passenger transportation vehicle may be enhanced.

Further, the first desired stop position may be a position for riding of the first user, and the second desired stop position may be a position for riding of the second user.

Accordingly, because the second route in which the desired riding position of the first user as the first desired stop position is changed is approved and the path to the desired riding position of the second user as the second desired stop position is thereby shortened, the running efficiency of the passenger transportation vehicle may be enhanced.

Further, the first desired stop position may be a position for riding of the first user, and the second desired stop position may be a position for getting-off of the second user.

Accordingly, because the second route in which the desired riding position of the first user as the first desired stop position is changed is approved and the path to the desired getting-off position of the second user as the second desired stop position is thereby shortened, the running efficiency of the passenger transportation vehicle may be enhanced.

Further, a first route that is decided based on the first stop position information may be a route that reaches the first desired stop position, the second route may be a route in which the vehicle passes a region within the range of the gap from the first desired stop position and reaches the second desired stop position, and the benefit or the cost may be a benefit or a cost that corresponds to a difference between a distance of a route in which the vehicle passes the first route and subsequently reaches the second desired stop position and a distance of the second route.

Accordingly, in a case where the second route is approved, the first user may gain the benefit that corresponds to the distance (path) shortened by passing the second route compared to a case of passing the first route.

Further, in the information processing method, a notification that indicates that the benefit or the cost is assigned may be transmitted to the apparatus that is controlled by the first user.

Accordingly, the first user may confirm that the benefit or the cost is assigned by the apparatus that is controlled by the first user.

Further, in a case where plural second users are present, tolerable range information that indicates a range of a gap from the second desired stop position, the range which is tolerated by the second user, among the plural second users, for whom the second desired stop position is close to the first desired stop position may be acquired, the second route may be decided based also on the acquired tolerable range information of the close second user, an inquiry of whether or not the decided second route is approved may be transmitted to an apparatus that is controlled by the close second user, a benefit may be assigned to the close second user in a case where a response that indicates that the second route is approved is received from the apparatus that is controlled by the second user, or a cost may be assigned to the close second user in a case where a response that indicates that the second route is not approved is received from the apparatus that is controlled by the second user.

Accordingly, the desired stop position of the second user for whom the second desired stop position is close to the first desired stop position is also changed, and the path to the desired stop position of the second user for whom the second desired stop position is far from the first desired stop position is thereby shortened. Accordingly, even in a case where plural second users are present, the running efficiency of the passenger transportation vehicle may be enhanced.

Further, in a case where plural second users are present after the response that indicates that the second route is approved is received from the apparatus that is controlled by the first user, the inquiry may not be transmitted to the apparatus.

For example, in a case where the first user again receives the inquiry about a route change despite the fact that the first user once approves the second route, the first user may feel a repeated inquiry to be troublesome. However, because the inquiry about the route change is not again made to the first user after the first user once approves the second route, this may prevent the first user from feeling trouble.

Further, the range of the gap may include a range that is walkable for a user.

Accordingly, because the range of the gap is a walkable range, the second route is more likely to be approved by the first user or the second user.

Further, the inquiry may further include information that indicates the benefit or the cost which is assigned by approving the second route, and the apparatus may further be caused to present the benefit or the cost.

Accordingly, the first user or the second user may confirm the benefit or the cost that is assigned by the apparatus that is controlled by the first user or the second user himself/herself.

Further, the inquiry may further include information that indicates the second route, and the apparatus may further be caused to present the second route.

Accordingly, the first user or the second user may confirm the second route by the apparatus that is controlled by the first user or the second user himself/herself.

Further, the inquiry may further include information that indicates a first route which is decided based on the first stop position information, and the apparatus may further be caused to present the first route together with the second route.

Accordingly, the first user or the second user may confirm the first route together with the second route by the apparatus that is controlled by the first user or the second user himself/herself.

Further, an information processing system of the present disclosure is an information processing system including: an information processing apparatus; and an apparatus which is controlled by a first user and communicates with the information processing apparatus. The information processing apparatus includes: a first acquisition unit that acquires first stop position information which indicates a first desired stop position for riding or getting-off of the first user who rides a vehicle and tolerable range information which indicates a range of a gap from the first desired stop position, the range which is tolerated by the first user; a second acquisition unit that acquires second stop position information which indicates a second desired stop position for riding or getting-off of a second user who rides the vehicle; a second decision unit that decides a second route based on the first stop position information, the tolerable range information, and the second stop position information; an apparatus communication unit that transmits an inquiry of whether or not the second route is approved to the apparatus which is controlled by the first user; and an assigning unit that assigns a benefit to the first user in a case where a response which indicates that the second route is approved is received from the apparatus which is controlled by the first user or assigns a cost to the first user in a case where a response which indicates that the second route is not approved is received from the apparatus which is controlled by the first user.

Accordingly, an information processing system that may enhance the running efficiency of the passenger transportation vehicle may be provided.

Further, a recording medium of the present disclosure stores a program that causes a computer to execute the information processing method.

A program that may enhance the running efficiency of the passenger transportation vehicle may be provided.

Embodiments will hereinafter be described in detail with reference to drawings.

Note that all the embodiments described in the following illustrate general or specific examples. Numerical values, shapes, configuration elements, arrangement positions or connection manners of configuration elements, steps, orders of steps, and so forth that are described in the following embodiments are examples and are not intended to limit the present disclosure. Further, the configuration elements that are not described in the independent claims which provide the most superordinate concepts among the configuration elements in the following embodiments will be described as arbitrary configuration elements.

(Embodiments)

The embodiments will hereinafter be described with reference to FIG. 1 to FIG. 17.

[1. Configuration of Information Processing System]

FIG. 1 is a block diagram that illustrates one example of a configuration of an information processing system 1 according to an embodiment.

The information processing system 1 is a system for performing vehicle allocation of a passenger transportation vehicle (also referred to as vehicle) and it is possible that the information processing system 1 is applied to a shared taxi, a shared bus, and so forth, for example. Further, in the future, it is possible that the information processing system 1 will be applied to a shared taxi that uses an autonomous vehicle. The information processing system 1 includes an information processing apparatus 10 and a first apparatus 100.

The first apparatus 100 is a computer that includes a processor (microprocessor), a memory, a communication interface (a communication circuit or the like), a user interface, and so forth and is capable of communication with the information processing apparatus 10. For example, the first apparatus 100 is capable of communication with the information processing apparatus 10 by a network via a base station. The memory is a ROM, a RAM, or the like and may include a non-volatile memory, for example. The user interface includes a display such as a liquid crystal display (LCD) and an input apparatus such as a keyboard or a touch panel, for example. The processor executes a program that is stored in the memory and thereby performs processes for controlling the communication interface, the display, and so forth. A program for causing the processor to execute the processes is stored in the memory. The first apparatus 100 is a portable terminal such as a smartphone or a tablet, for example. The first apparatus 100 is an apparatus that is controlled by a first user, for example, and presents information to the first user based on the information that is received from the information processing apparatus 10. Further, the first apparatus 100 transmits the information that is input by the first user to the information processing apparatus 10. Note that in a case where the information processing system 1 is applied to the shared bus or the like, the first apparatus 100 may be an apparatus or the like, which is placed in a bus stop or the like and is used (controlled) in a case where a user rides the shared bus.

The information processing apparatus 10 is an apparatus for performing vehicle allocation of the passenger transportation vehicle and is a server apparatus, for example. The information processing apparatus 10 is capable of communication with the first apparatus 100 and a vehicle or the like. The information processing apparatus 10 includes an input information acquisition unit 20, a route calculation unit 30, an apparatus communication unit 40, an assignment unit 50, a user information management unit 60, a vehicle position acquisition unit 70, and a vehicle communication unit 80 as function configuration elements for enhancing the running efficiency of the passenger transportation vehicle. Here, each of the function configuration elements will be described with reference to FIG. 2.

Figure 2:
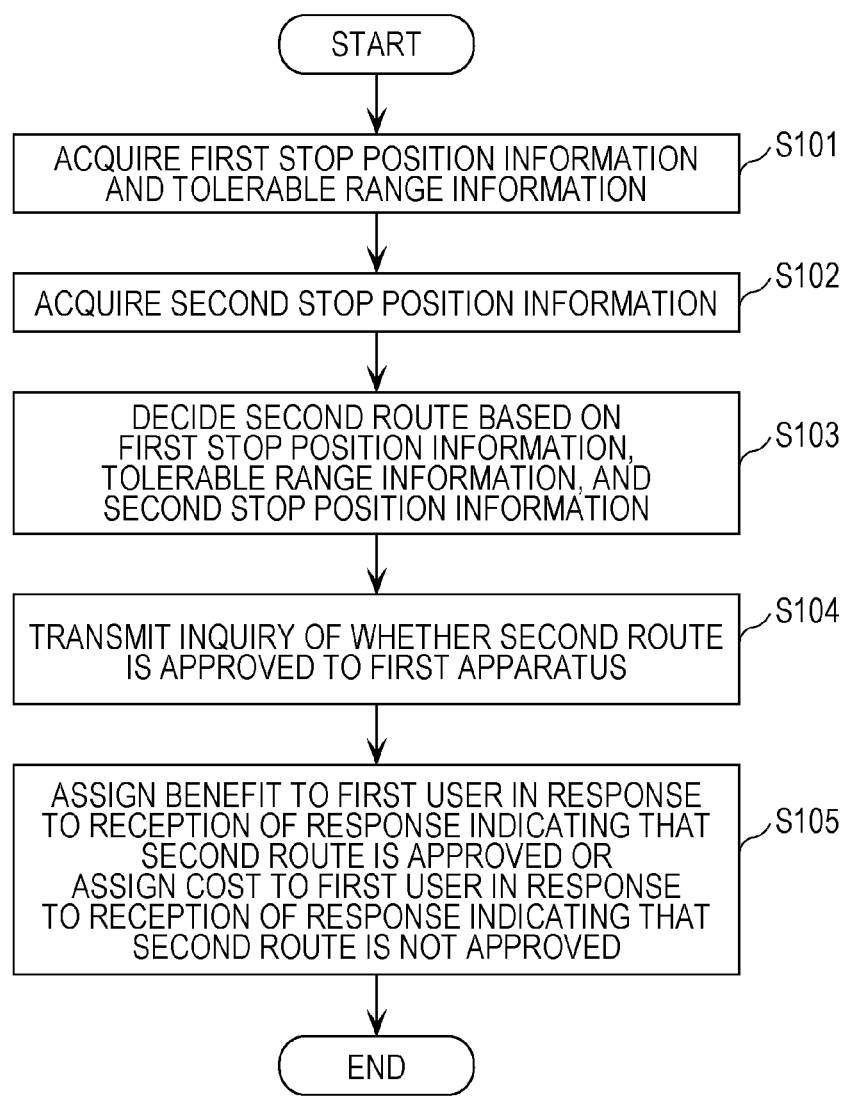
FIG. 2 is a flowchart that illustrates one example of an action of an information processing apparatus in the embodiment.

FIG. 2 is a flowchart that illustrates one example of an action of the information processing apparatus 10 in the embodiment.

The input information acquisition unit 20 acquires the information that is input to the first apparatus 100 by the first user. For example, the input information acquisition unit 20 acquires information by reception of the information transmitted from the first apparatus 100 via the communication interface included in the information processing apparatus 10. Further, the input information acquisition unit 20 may acquire the information that is stored in the user information management unit 60. The information that is acquired by the input information acquisition unit 20 is used in processes in the route calculation unit 30, the assignment unit 50, and the vehicle communication unit 80. The input information acquisition unit 20 includes a first acquisition unit 21 and a second acquisition unit 22 as function configuration elements.

The first acquisition unit 21 acquires first stop position information that indicates a first desired stop position for riding or getting-off of the first user who rides the vehicle and tolerable range information that indicates a range of a gap from the first desired stop position, which is tolerated by the first user (step S101). The range of the gap includes a range which is walkable for the first user, for example. The second acquisition unit 22 acquires second stop position information that indicates a second desired stop position for riding or getting-off of a second user who rides the vehicle (step S102). Note that the user who rides the vehicle may be a user who is yet to ride the vehicle or may be a user who is riding the vehicle. The first stop position information, the tolerable range information, and the second stop position information will be described later. Further, in the following, a description will be made on an assumption that the first desired stop position of the first user is closer to the present position of the vehicle than the second desired stop position of the second user.

The route calculation unit 30 calculates a traveling route (also referred to as route) of the vehicle that communicates with the information processing apparatus 10 based on the information that is acquired by the input information acquisition unit 20. For example, the route calculation unit 30 calculates at least one route to be a candidate in accordance with the circumstance. The route calculation unit 30 includes a first decision unit 31 and a second decision unit 32 as function configuration elements.

The first decision unit 31 decides a first route of the vehicle based on the first stop position information. The second decision unit 32 decides a second route based on the first stop position information, the tolerable range information, and the second stop position information (step S103). The first route and the second route will be described later.

The apparatus communication unit 40 transmits an inquiry of whether the second route decided by the route calculation unit 30 is approved to the first apparatus 100 that is controlled by the first user (step S104). For example, the apparatus communication unit 40 transmits an inquiry of which of the first route and the second route that are decided by the route calculation unit 30 is selected to the first apparatus 100 that is controlled by the first user. Note that as the information that indicates the second route decided by the route calculation unit 30, information that may be recognized by the first user (for example, a map on which an image indicating the route is arranged) may be generated in the information processing apparatus 10, and the apparatus communication unit 40 may transmit the information to the first apparatus 100. Further, the information that indicates the first route may also be generated. Further, the apparatus communication unit 40 receives a response to the inquiry transmitted to the first apparatus 100 from the first apparatus 100. Note that selection of the second route includes selection of a position on the second route, and the information that indicates the second route may be an image that indicates a position on the second route. A single selection candidate or plural selection candidates of the position on the second route may be present.

The assignment unit 50 assigns a benefit to the first user in response to reception of the response that indicates that the second route is approved from the first apparatus 100 or assigns a cost to the first user in response to reception of the response that indicates that the second route is not approved from the first apparatus 100 (step S105). For example, the response is the response that indicates the second route is selected, the input information acquisition unit 20 acquires the response that is received via the communication interface, and the assignment unit 50 thereby assigns the benefit or the cost, which is calculated in accordance with the second route selected by the first user, to the first user. A calculation method of the benefit (reward) will be described later.

The user information management unit 60 stores the tolerable range information that is acquired by the first acquisition unit 21. Accordingly, the first acquisition unit 21 may acquire the tolerable range information from the user information management unit 60 from the next time, and work in which the first user inputs the tolerable range information may be reduced. Note that the user information management unit 60 may in advance store the tolerable range information.

The vehicle position acquisition unit 70 acquires the present position of the vehicle that communicates with the information processing apparatus 10. The vehicle position acquisition unit 70 acquires the present position of the vehicle by using a global positioning system (GPS) that is mounted on the vehicle, for example. The present position of the vehicle that is acquired by the vehicle position acquisition unit 70 is used for a decision or the like of the route by the route calculation unit 30.

The vehicle communication unit 80 receives information from the vehicle and transmits information to the vehicle via the communication interface. For example, the vehicle communication unit 80 receives the present position of the vehicle. Further, for example, the vehicle communication unit 80 transmits the information about the route approved by the user to the vehicle. Note that the vehicle controls the vehicle based on the information and presents the information to a person in the vehicle.

The information processing apparatus 10 is a computer that includes a processor (microprocessor), a memory, a communication interface (a communication circuit or the like), and so forth. The memory is a ROM, a RAM, or the like and may store a control program (computer program) that is executed by the processor. For example, the processor acts in accordance with the control program (computer program), and the information processing apparatus 10 thereby realizes various kinds of functions (the input information acquisition unit 20, the route calculation unit 30, the apparatus communication unit 40, the assignment unit 50, the user information management unit 60, the vehicle position acquisition unit 70, and the vehicle communication unit 80).

In the following, specific actions of the information processing apparatus 10 will be described by exemplifying three embodiments.

[2-1. First Embodiment]

A first embodiment will be described with reference to FIG. 3 to FIG. 11.

Figure 3:
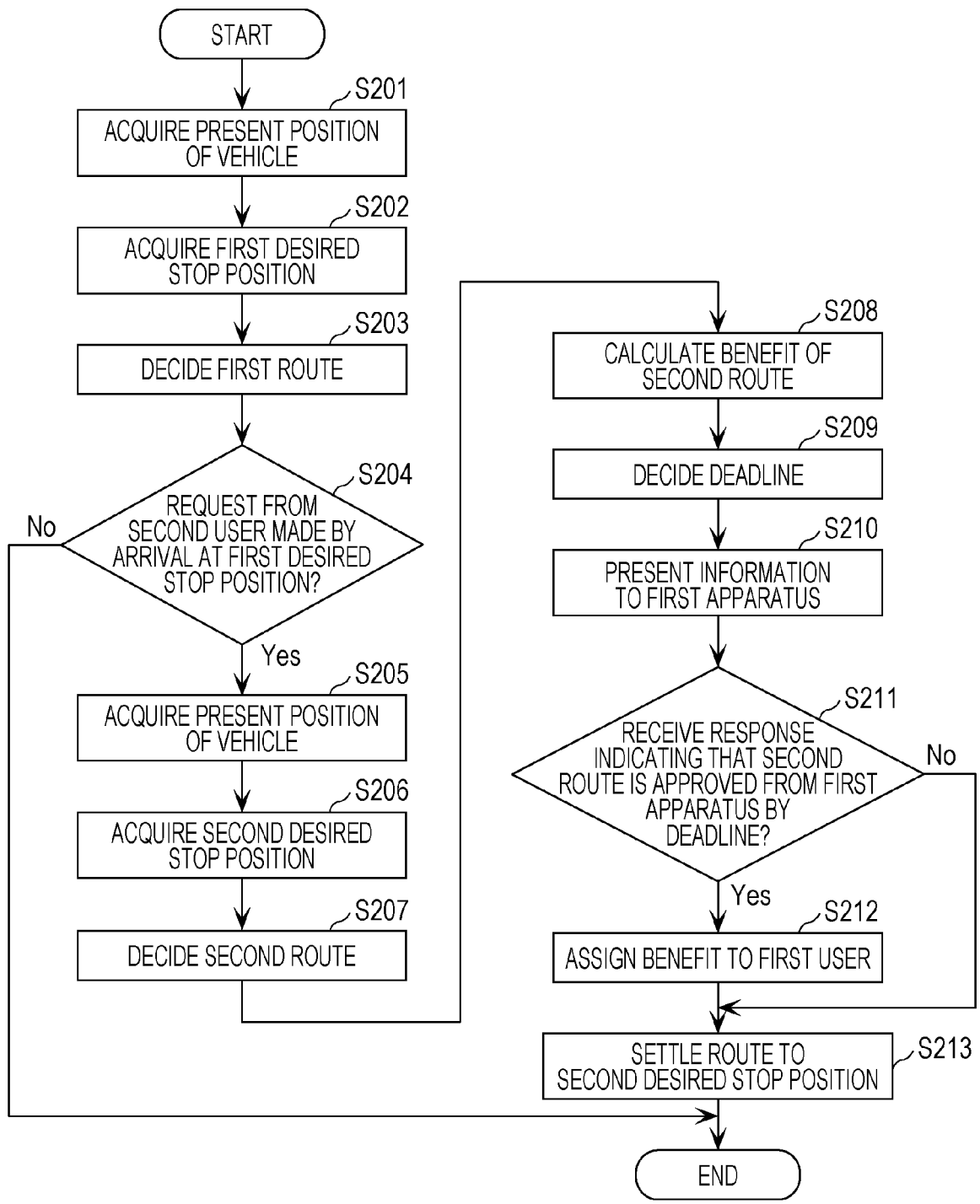
FIG. 3 is a flowchart that illustrates one example of an action of the information processing apparatus in a first embodiment.

FIG. 3 is a flowchart that illustrates one example of an action of the information processing apparatus 10 in the first embodiment. A process from step S201 is started by reception of a request for vehicle allocation of the passenger transportation vehicle from the first user by the information processing apparatus 10, for example.

First, the vehicle position acquisition unit 70 acquires the present position of the vehicle (step S201).

Figure 4:
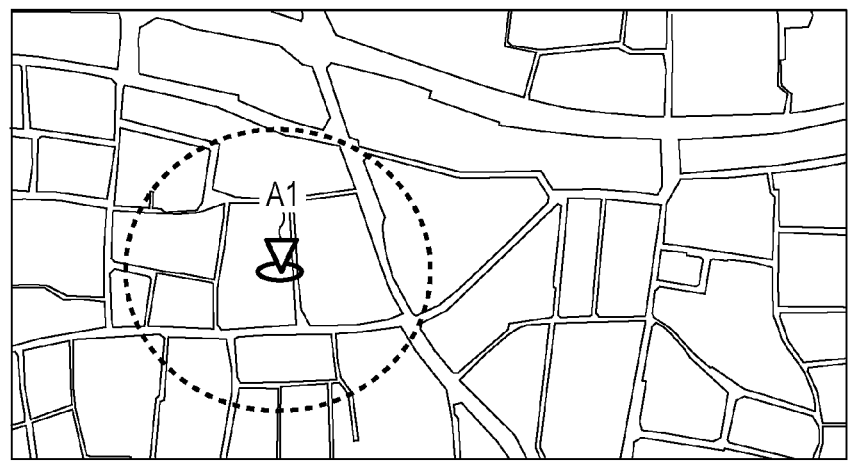
FIG. 4 is a diagram that illustrates one example of a first desired stop position in the first embodiment.

Next, the first acquisition unit 21 acquires the first desired stop position (step S202). FIG. 4 is a diagram that illustrates one example of a first desired stop position A1 in the first embodiment. The first desired stop position A1 that is designated by the first user is indicated in FIG. 4. In this case, the first acquisition unit 21 acquires the range of the gap (also referred to as tolerable range) from the first desired stop position A1, which is tolerated by the first user. The tolerable range is indicated by a broken line circle in FIG. 4.

Figure 5:
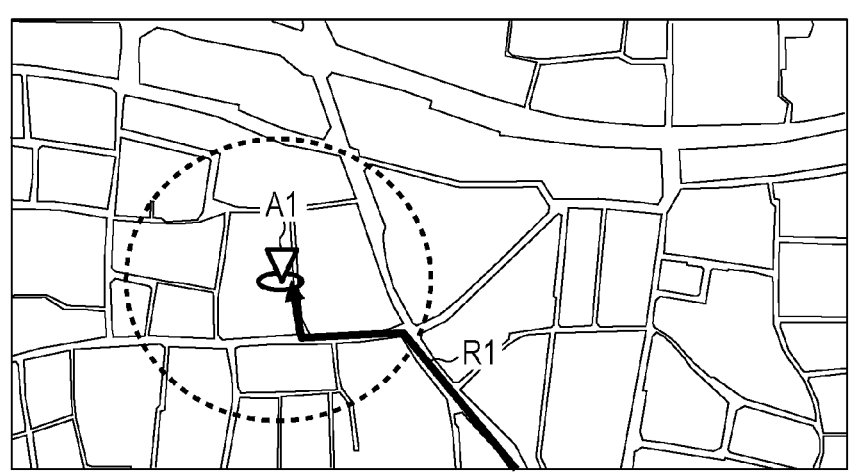
FIG. 5 is a diagram that illustrates one example of a first route in the first embodiment.

Next, the first decision unit 31 decides the first route of the vehicle based on the first stop position information (step S203). Specifically, the first decision unit 31 decides the first route of the vehicle based on the present position of the vehicle and the first stop position information. FIG. 5 is a diagram that illustrates one example of a first route R1 in the first embodiment. The first route R1 is the route that starts from the present position of the vehicle and reaches the first desired stop position A1.

Then, the vehicle travels on the first route R1 toward the first desired stop position A1.

Next, the information processing apparatus 10 assesses whether or not the second user makes the request for vehicle allocation by the arrival of the vehicle at the first desired stop position A1 (step S204).

In a case where the second user does not make the request for vehicle allocation by the arrival of the vehicle at the first desired stop position A1 (No in step S204), the vehicle stops for riding or getting-off of the first user at the first desired stop position A1.

In a case where the second user makes the request for vehicle allocation by the arrival of the vehicle at the first desired stop position A1 (Yes in step S204), the vehicle position acquisition unit 70 acquires the present position of the vehicle at the time when the request is accepted (step S205).

Figure 6:
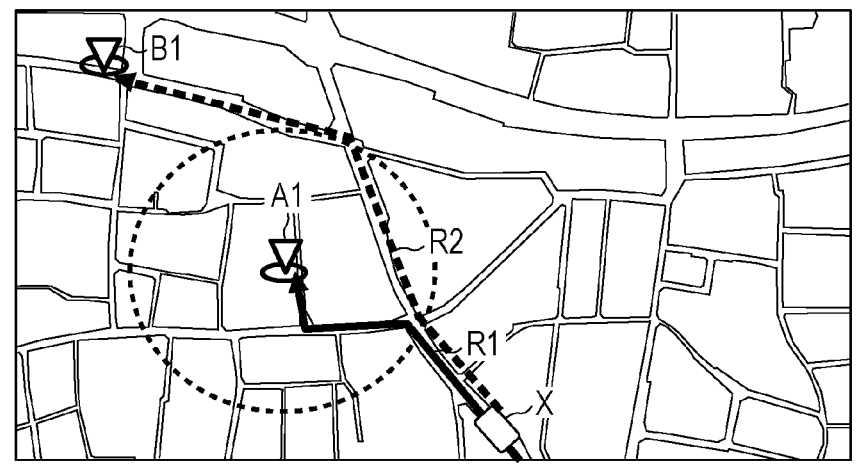
FIG. 6 is a diagram that illustrates examples of a second desired stop position and a second route in the first embodiment.

Next, the second acquisition unit 22 acquires the second desired stop position (step S206), and the second decision unit 32 decides the second route based on the first stop position information, the tolerable range information of the first user, and the second stop position information (step S207). FIG. 6 is a diagram that illustrates examples of a second desired stop position B1 and a second route R2 in the first embodiment. The second desired stop position B1 that is designated by the second user is indicated in FIG. 6. Specifically, the second decision unit 32 decides the second route R2 of the vehicle based on a present position X of the vehicle, the first stop position information, the tolerable range information of the first user, and the second stop position information. Then, the route calculation unit 30 calculates the benefit of the second route R2 (step S208). Here, a decision method of the second route R2 and a calculation method of the benefit will be described with reference to FIG. 7 and FIG. 8.

Figure 7:
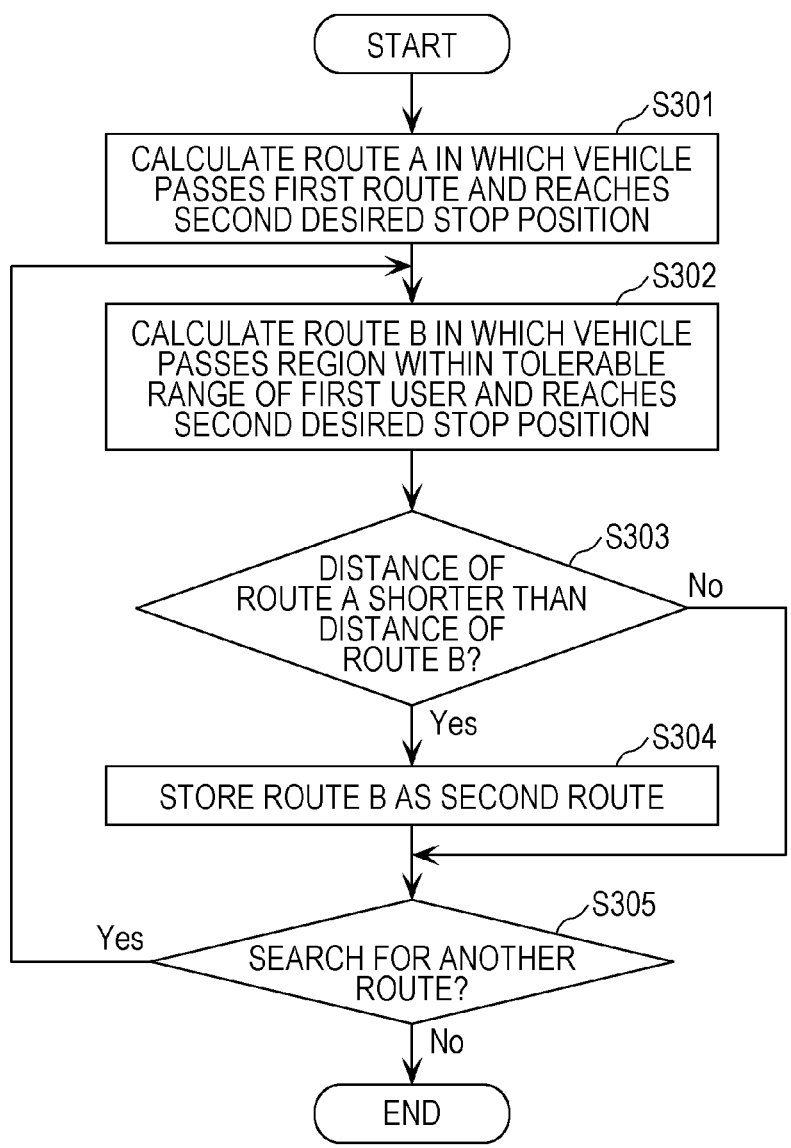
FIG. 7 is a flowchart that illustrates one example of a decision method of the second route.
Figure 8:
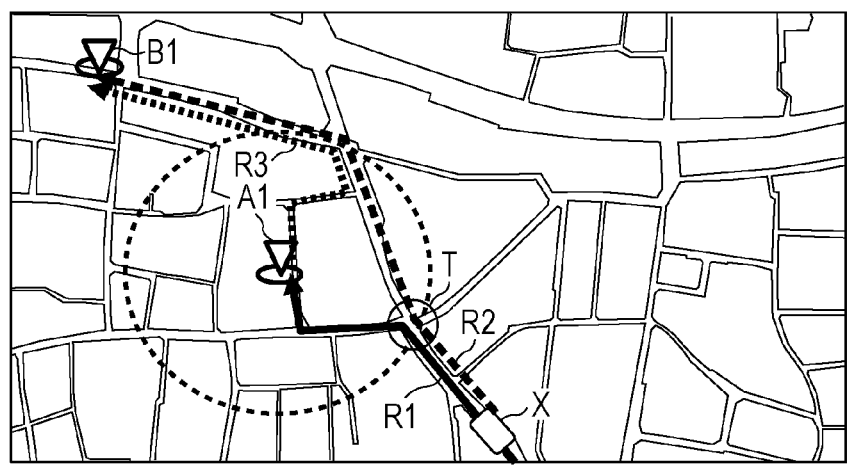
FIG. 8 is a diagram for explaining a calculation method of a benefit in the first embodiment.

FIG. 7 is a flowchart that illustrates one example of the decision method of the second route R2. FIG. 8 is a diagram for explaining the calculation method of the benefit in the first embodiment.

First, the route calculation unit 30 calculates a route A in which the vehicle passes the first route R1 and thereafter reaches the second desired stop position B1 (step S301). The route A is the route in which the first route R1 is connected with a route R3 that starts from the first desired stop position A1 and reaches the second desired stop position B1, which are indicated in FIG. 8. As illustrated in FIG. 8, it is understood that the route A is the route that reaches the second desired stop position B1 via the first desired stop position A1 and is thus a detour.

Next, the route calculation unit 30 calculates a route B in which the vehicle passes a region within the tolerable range of the first user and reaches the second desired stop position B1 (step S302).

Next, the route calculation unit 30 assesses whether or not the distance (path) of the route A is shorter than the distance (path) of the route B (step S303).

In a case where the route calculation unit 30 assesses that the distance of the route A is shorter than the distance of the route B (Yes in step S303), the route calculation unit 30 stores the calculated route B as the second route in the memory or the like included in the information processing apparatus 10 (step S304). For example, the route calculation unit 30 stores the calculated route B as the second route R2, which is indicated in FIG. 8, in the memory or the like included in the information processing apparatus 10.

Figure 9:
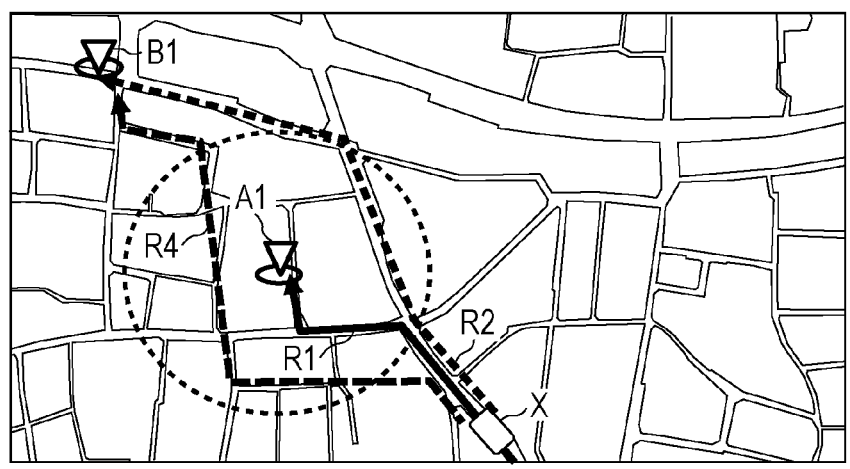
FIG. 9 is a diagram that illustrates plural second routes in the first embodiment.

Note that because the route B may be a route in which the vehicle passes a region within the tolerable range of the first user and reaches the second desired stop position B1, it is possible that several routes B are calculated. Accordingly, the route calculation unit 30 assesses whether or not another route is searched for (step S305). In a case where another route is searched for (Yes in step S305), the route calculation unit 30 repeatedly performs processes from step S302 to step S304. FIG. 9 is a diagram that illustrates plural second routes in the first embodiment. For example, as illustrated in FIG. 9, the route calculation unit 30 decides second routes R2 and R4 in which the vehicle passes a region within the tolerable range of the first user and reaches the second desired stop position B1.

Further, the route calculation unit 30 calculates the benefit that corresponds to the difference between the distance of the route A in which the vehicle passes the first route R1 and thereafter reaches the second desired stop position B1 and the distance of the second route. For example, as illustrated in FIG. 8, in a case of the second route R2, the benefit is calculated by multiplying the difference between the distance of the route A (the route in which the first route R1 is connected with the route R3) and the distance of the second route R2 by a prescribed coefficient. The prescribed coefficient is appropriately decided by a provider of the passenger transportation vehicle, for example.

Next, the route calculation unit 30 decides the deadline in a case where the first user is caused to select whether the vehicle travels on the first route R1 without any change or travels on the second route (step S209). For example, as illustrated in FIG. 8, the deadline may be decided in accordance with the distance from the present position X of the vehicle to a branch point T of the first route R1 and the second route R2 or may be decided in accordance with the predicted time in which the vehicle starts from the present position X and reaches the branch point T. The deadline may be expressed by distance or time.

Next, the apparatus communication unit 40 transmits the information about whether the second route is approved to the first apparatus 100 and causes the first apparatus 100 to present the information (step S210). For example, the apparatus communication unit 40 transmits the information about which of the first route R1 and the second route is selected to the first apparatus 100 and causes the first apparatus 100 to present the information. The information is displayed as an image on the display provided to the first apparatus 100, for example, and the first user may select either one of the first route R1 and the second route. Note that in a case where plural second routes are decided, the first user selects any of the first route R1 and the plural second routes (here, the second routes R2 and R4).

Next, the assignment unit 50 assesses whether or not the response that indicates that the second route is approved is received from the first apparatus 100 by the decided deadline (step S211). In a case where the response that indicates that the second route is approved is received from the first apparatus 100 by the decided deadline (Yes in step S211), the assignment unit 50 assigns the benefit to the first user (step S212). In this case, the information processing apparatus 10 transmits a notification that indicates that the benefit is assigned to the first apparatus 100. Accordingly, the first user may recognize that the benefit is assigned.

Note that the benefit is a benefit that is returned from the profit which is gained by the provider of the passenger transportation vehicle because a detour due to traveling toward the first desired stop position A1 becomes unnecessary, the profitability for one vehicle thereby increases, and the energy consumption lowers. Consequently, in a case where the vehicle travels on the second route, the first user rides or gets off the vehicle in a position on the second route, which is away from the first desired stop position A1, and has to go for the distance between the first desired stop position A1 as the original destination or the like and the position on the second route by walking or the like. However, in exchange, the first user may obtain the benefit.

Then, the route calculation unit 30 settles the route to the second desired stop position B1 (step S213). In a case where the second route is approved by the deadline, the second route is settled as the traveling route. In a case where the second route is not approved by the deadline, the route that reaches the second desired stop position B1 via the first route R1 (for example, the route in which the first route R1 is connected with the route R3) is settled as the traveling route.

Note that the first desired stop position A1 may be the position for the first user to get off the vehicle or may be the position to ride the vehicle. Further, the second desired stop position B1 may be the position for the second user to get off the vehicle or may be the position to ride the vehicle.

For example, in a case where the first desired stop position A1 is the position for the first user to get off the vehicle and the second desired stop position B1 is the position for the second user to ride the vehicle, the passenger transportation vehicle makes the first user get off the vehicle and thereafter makes the second user ride the vehicle. In this case, in a case where the second route that reaches a desired riding position of the second user not via a desired getting-off position of the first user is approved, the first user gets off the vehicle in a position away from the desired getting-off position, and the second user may ride the vehicle in a short waiting time.

For example, in a case where the first desired stop position is the position for the first user to get off the vehicle and the second desired stop position is the position for the second user to get off the vehicle, the passenger transportation vehicle makes the first user between the first user and the second user who share the vehicle get off the vehicle and thereafter makes the second user get off the vehicle. In this case, in a case where the second route that reaches the desired getting-off position of the second user not via the desired getting-off position of the first user is approved, the first user gets off the vehicle in a position away from the desired getting-off position, and the second user may get off the vehicle earlier than planned.

For example, in a case where the first desired stop position is the position for the first user to ride the vehicle and the second desired stop position is the position for the second user to ride the vehicle, the passenger transportation vehicle makes the first user ride the vehicle and thereafter makes the second user ride the vehicle, and the first user and the second user share the vehicle. In this case, in a case where the second route that reaches the desired riding position of the second user not via the desired riding position of the first user is approved, the first user rides the vehicle in a position away from the desired riding position, and the second user may ride the vehicle in a short waiting time.

For example, in a case where the first desired stop position is the position for the first user to ride the vehicle and the second desired stop position is the position for the second user to get off the vehicle, the passenger transportation vehicle makes the second user ride the vehicle and thereafter makes the first user ride the vehicle, the first user and the second user share the vehicle, and the second user is thereafter made get off the vehicle. In this case, in a case where the second route that reaches the desired getting-off position of the second user not via the desired riding position of the first user is approved, the first user rides the vehicle in a position away from the desired riding position, and the second user may get off the vehicle earlier than planned.

Next, the user interface of the first apparatus 100 will be described with reference to FIG. 10 and FIG. 11.

Figure 10:
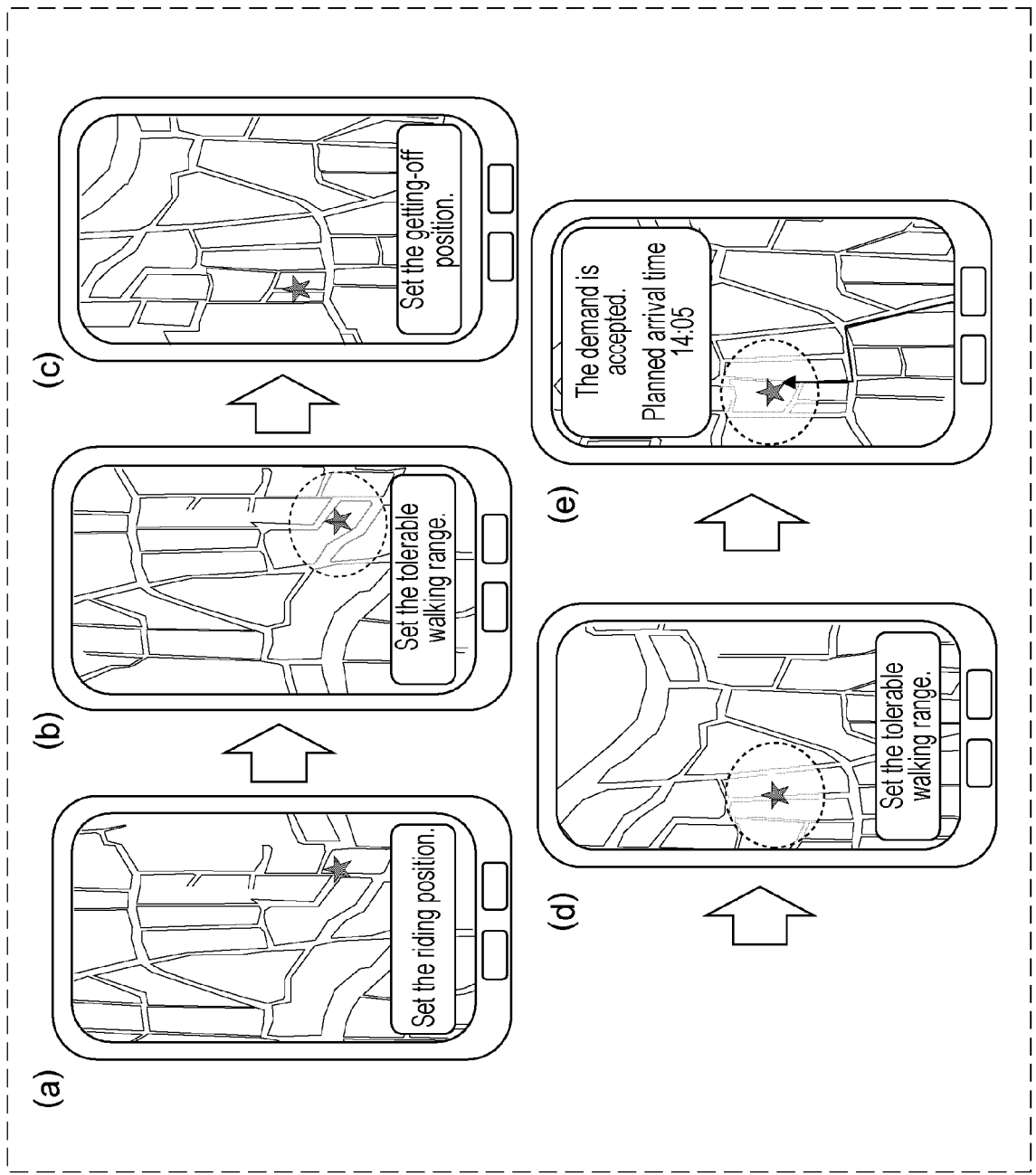
FIG. 10 is a diagram that illustrates one example of a user interface in a case of a vehicle allocation request.

FIG. 10 is a diagram that illustrates one example of the user interface in a case of a vehicle allocation request.

For example, the first user requests vehicle allocation from the provider of the passenger transportation vehicle by an application or the like that is installed in the first apparatus 100.

First, as illustrated in FIG. 10(*a*), the first user designates the desired riding position. For example, the first user taps or clicks the desired riding position on a map that is displayed on the display (touch panel display).

Next, as illustrated in FIG. 10(*b*), the first user designates the tolerable range of the gap from the desired riding position. The tolerable range is a range in which the first user tolerates movement by walking from the desired riding position in a case where the riding position is off from the desired riding position, for example. For example, the first user designates the tolerable range by surrounding a periphery of the designated desired riding position by a touch, a click, or the like.

Next, as illustrated in FIG. 10(c), the first user designates the desired getting-off position. For example, the first user taps or clicks the desired getting-off position on the map that is displayed on the display.

Next, as illustrated in FIG. 10(d), the first user designates the tolerable range of the gap from the desired getting-off position. The tolerable range is a range in which the first user tolerates movement by walking from the desired getting-off position in a case where the getting-off position is off from the desired getting-off position, for example. For example, the first user designates the tolerable range by surrounding a periphery of the designated desired getting-off position by a touch, a click, or the like.

Then, planned arrival times at a planned riding position and a planned getting-off position are displayed. FIG. 10(e) illustrates one example of the display of the planned arrival time at the planned getting-off position.

Figure 11:
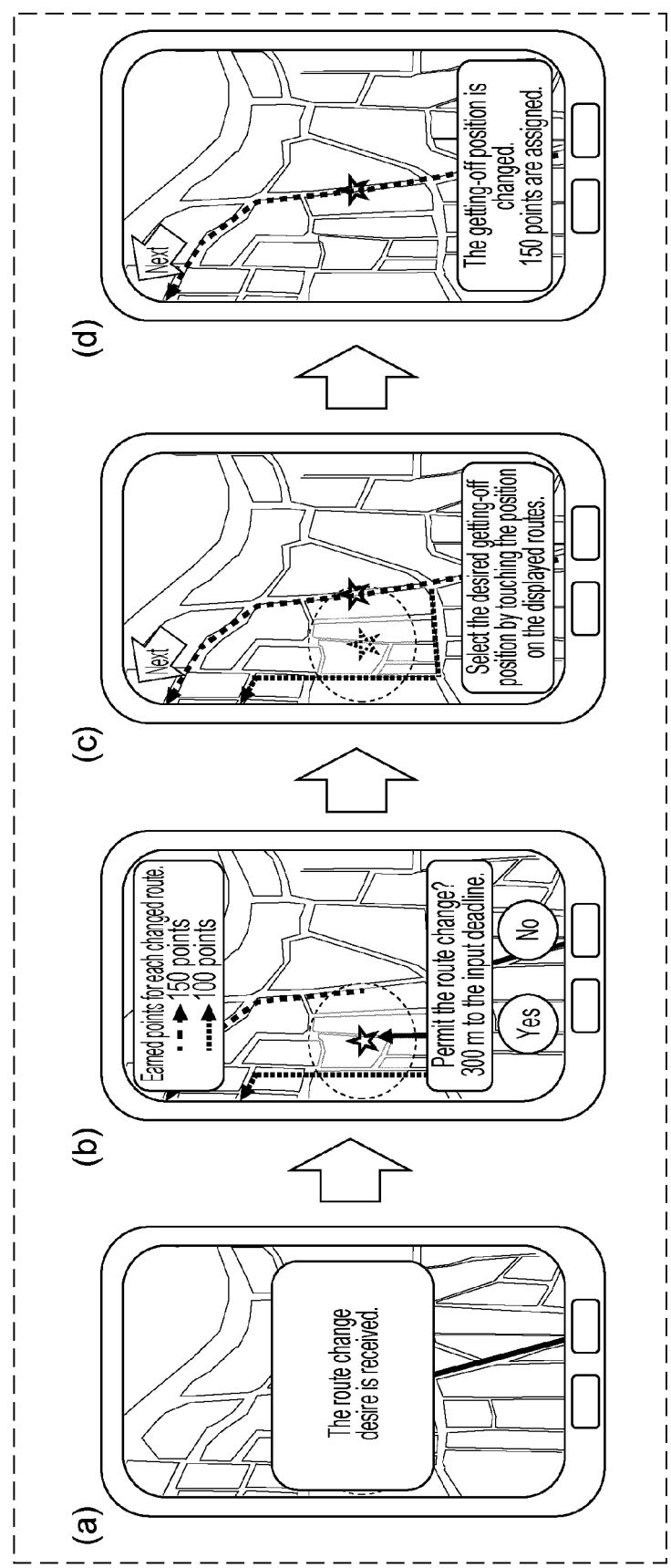
FIG. 11 is a diagram that illustrates one example of the user interface in a case of receiving a route change desire due to the vehicle allocation request by a second user.

FIG. 11 is a diagram that illustrates one example of the user interface in a case of receiving a route change desire due to the vehicle allocation request by the second user. In the following, it is assumed that the vehicle allocation request by the second user is made while the first user is riding the vehicle.

For example, the second user requests vehicle allocation from the provider of the passenger transportation vehicle by an application or the like that is installed in a second apparatus which is controlled by the second user. As illustrated in FIG. 10, the second user also designates the desired riding position and the desired getting-off position. Here, in a case where the desired getting-off position of the first user is close to the desired riding position or desired getting-off position of the second user, the information processing apparatus 10 determines that the vehicle which the first user rides is allocated for the second user. Then, the information processing apparatus 10 calculates the second route as described above.

First, as illustrated in FIG. 11(a), the information processing apparatus 10 notifies the first apparatus 100 of a fact that the route (first route) on which the vehicle presently travels is to be changed to the second route, in other words, of an inquiry of whether the second route is approved.

Next, as illustrated in FIG. 11(b), the information processing apparatus 10 causes the first apparatus 100 to display, as the contents of the inquiry, the decided second route (here, two second routes) and the benefit that may be obtained by the first user in a case where the first route is changed to the second route. Here, as the benefit that may be obtained for each of the second routes, for example, points that may be used in a case of riding the passenger transportation vehicle or that may be used in a case of purchasing merchandise. However, the benefit is not limited as long as the benefit serves as a certain incentive for the user such as cash that is transferred to a bank account or the like or a discount amount of a fare. Further, the assignment of the benefit may be reduction in a previously assigned cost or a usual cost. For example, the assignment of the benefit may be reduction in an extra fare, reduction in a commission, or the like. Further, the deadline for acceptance of permission for a route change is indicated in FIG. 11(b).

Next, in a case where the first route may be changed to the second route, the first user designates the getting-off position on the displayed second route by the deadline, as illustrated in FIG. 11(c).

Then, the information processing apparatus 10 causes the first apparatus 100 to display the second route that corresponds to the getting-off position which is designated by the first user and a fact that the benefit that corresponds to the second route is assigned to the first user.

Note that the designation of the desired riding position, the desired getting-off position, and the tolerable range is not limited to a touch, a click, or the like but may be performed by an input of a numerical value or the like.

As described in the above, for example, there is a case where the path to the second desired stop position B1 is shortened unless the vehicle travels via the first desired stop position A1 (the first route R1). In such a case, in a case where the stop position for the first user is changed within the range of the gap that is tolerated by the first user and the passage of the second route (for example, the second route R2) in which the path to the second desired stop position B1 is shortened is admitted, the running efficiency of the vehicle may be enhanced. However, in a case where the vehicle passes the second route R2, the stop position becomes off from the first desired stop position A1 of the first user. However, because the second route R2 is approved and the benefit is thereby assigned to the first user, the second route R2 is more likely to be approved by the first user, and the running efficiency of the passenger transportation vehicle may thereby be enhanced.

[2-2. Second Embodiment]

Next, a second embodiment will be described with reference to FIG. 12 and FIG. 13. Note that in the second embodiment, a description will be made about an action of the information processing apparatus 10 at a time after the vehicle allocation request is made by the second user, the second route is then approved by the first user, and the riding or getting-off position of the first user is changed.

Figure 12:
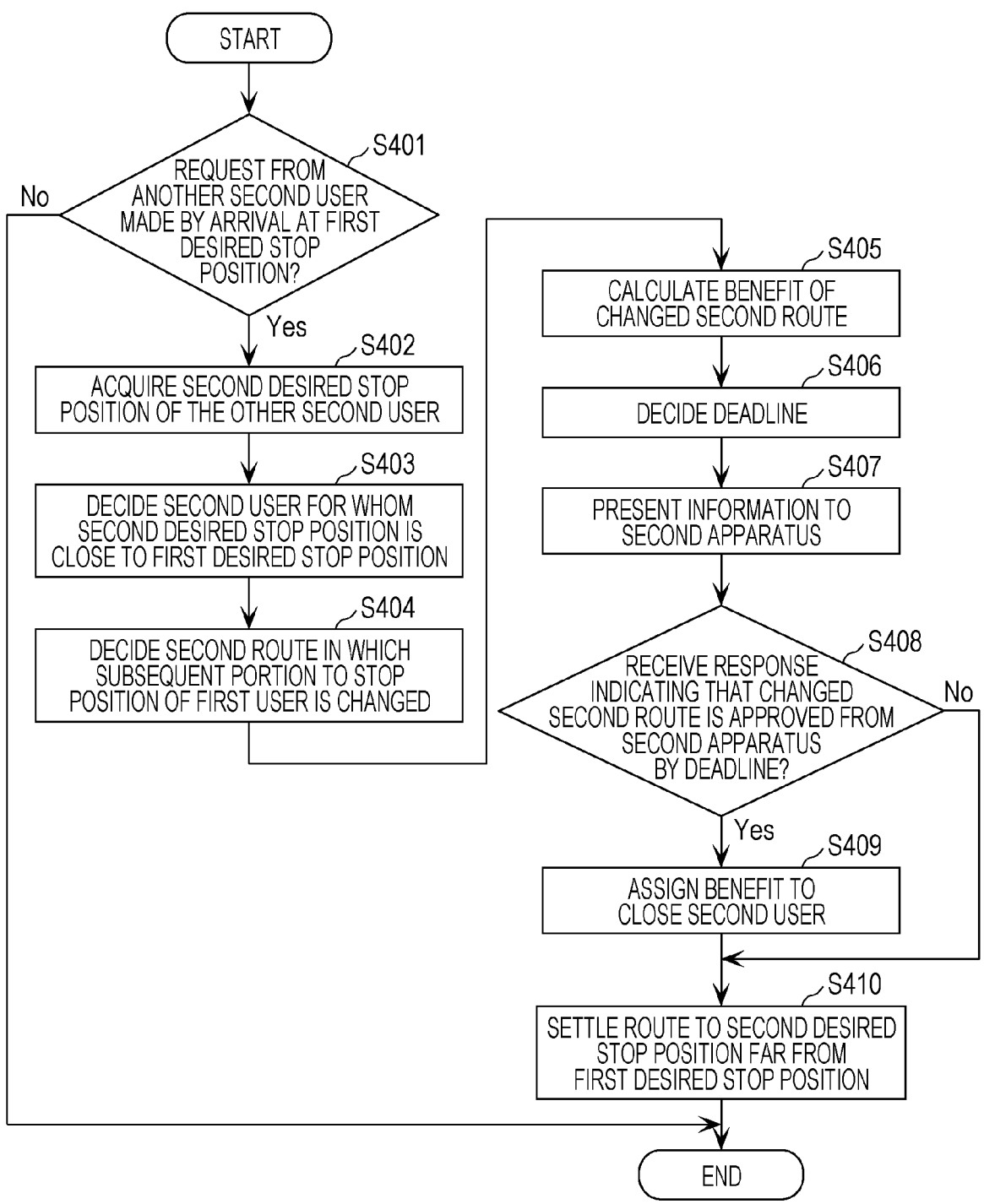
FIG. 12 is a flowchart that illustrates one example of an action of the information processing apparatus in a second embodiment.
Figure 13:
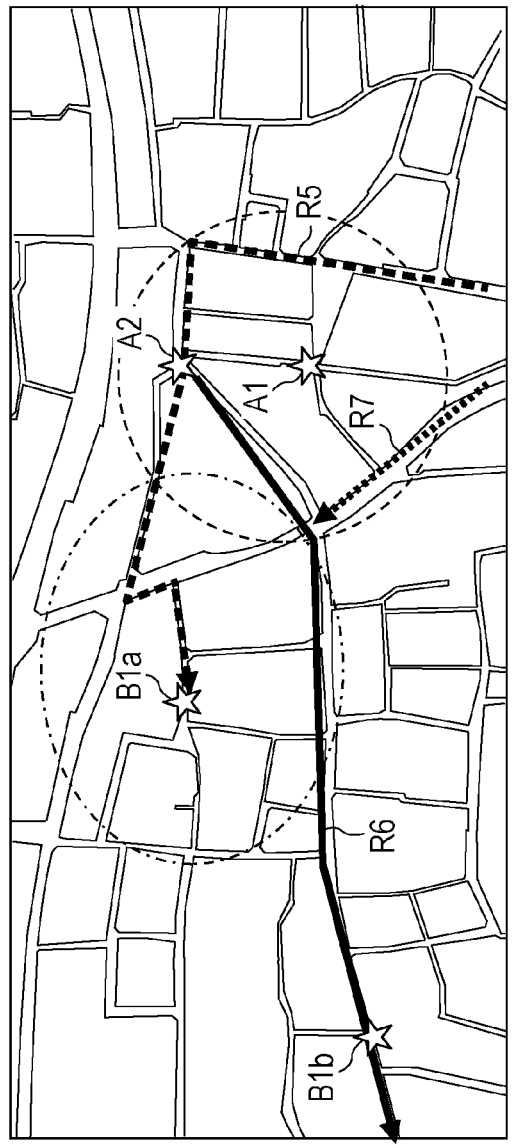
FIG. 13 is a diagram for explaining the second route in the second embodiment.

FIG. 12 is a flowchart that illustrates one example of the action of the information processing apparatus in the second embodiment. FIG. 13 is a diagram for explaining the second route in the second embodiment. FIG. 13 illustrates the first desired stop position A1, a second desired stop position B1a, a second route R5 in which the vehicle passes a region within the tolerable range of the first user and reaches the second desired stop position B1a, and a stop position A2 on the second route R5, which results from a change by the first user. Further, the tolerable range of the first user is indicated by a broken line circle in FIG. 13. Further, the second acquisition unit 22 acquires the range of the gap (also referred to as tolerable range) from the second desired stop position B1a, which is tolerated by the second user (a close second user who will be described later), and the tolerable range of the second user is indicated by a one-dot chain line circle in FIG. 13.

First, the information processing apparatus 10 assesses whether or not another second user makes the request for vehicle allocation by the arrival of the vehicle at the stop position A2 (step S401). Note that another second user is a different user from the second user who already makes the request for vehicle allocation and rides or gets off the vehicle in the second desired stop position B1a.

In a case where the other second user does not make the request for vehicle allocation by the arrival of the vehicle at the stop position A2 (No in step S401), the vehicle stops for riding or getting-off of the first user at the stop position A2 and continues to travel on the second route R5 toward the second desired stop position B1a for riding or getting-off of the second user.

In a case where the other second user makes the request for vehicle allocation by the arrival of the vehicle at the stop position A2 (Yes in step S401), the second acquisition unit 22 acquires the second desired stop position of the other second user (step S402). A second desired stop position B1$b$ that is designated by the other second user is indicated in FIG. 13.

Next, the information processing apparatus 10 decides the second user for whom the second desired stop position is close to the first desired stop position A1 (step S403). Here, the second user whose desired stop position is the second desired stop position B1$a$ is decided as the close second user. In the following, the second user whose desired stop position is the second desired stop position B1a will be referred to as close second user, and the second user whose desired stop position is the second desired stop position B1$b$ will be referred to as the other second user.

Next, the second decision unit 32 decides the second route in which the subsequent portion to the stop position A2 of the first user is changed based on the stop position A2 of the first user, the tolerable range information that indicates the tolerable range of the close second user, and the second stop position information that indicates the second desired stop position Bib (step S404). That is, the route to the stop position A2 in the second route R5 is not changed. This is because the first user already approves the second route R5 and the first user may feel the inquiry to be troublesome in a case where the inquiry about a change of the stop position A2 of the first user is again made. Thus, in a case where plural second users are present after the response that indicates that the second route R5 is approved is received from the first apparatus 100, the inquiry of whether the second route is approved is not transmitted to the first apparatus 100. Consequently, in this case, as a route R7 indicated in FIG. 13, a route change for changing the stop position A2 is not performed.

Although a description will not be made because a decision method of the second route in which the subsequent portion to the stop position A2 is changed is similar to the method that is described with FIG. 7, the second route is the route, whose distance (path) is shorter than the route in which the vehicle passes the second route R5 and thereafter reaches the second desired stop position B1$b$, and is the route, in which the vehicle passes a region within the tolerable range of the second user from the stop position A2 and reaches the second desired stop position Bib. That is, the second route in which the subsequent portion to the stop position A2 is changed is the route in which the route to the stop position A2 in the second route R5 is connected with a route R6 indicated in FIG. 13. Note that plural second routes in which the subsequent portion to the stop position A2 is changed may be decided.

Next, the route calculation unit 30 calculates the benefit of the second route in which the subsequent portion to the stop position A2 is changed (step S405). Specifically, the route calculation unit 30 calculates the benefit that corresponds to the difference between the distance of the route in which the vehicle passes the second route R5 and thereafter reaches the second desired stop position B1$b$ and the distance of the second route in which the subsequent portion to the stop position A2 is changed.

Next, the route calculation unit 30 decides the deadline in a case where the close second user is caused to select whether the vehicle travels on the second route R5 without any change or travels on the second route in which the subsequent portion to the stop position A2 is changed (step S406).

Next, the apparatus communication unit 40 transmits the information about whether the second route in which the subsequent portion to the stop position A2 is changed is approved to the second apparatus that is controlled by the close second user and causes the second apparatus to present the information (step S407). For example, the apparatus communication unit 40 transmits the information about which of the second route R5 and the second route in which the subsequent portion to the stop position A2 is changed is selected to the second apparatus that is controlled by the close second user and causes the second apparatus to present the information. The information is displayed as an image on a display provided to the second apparatus, for example, and the second user may select either one of the second route R5 and the second route in which the subsequent portion to the stop position A2 is changed. Note that in a case where plural second routes in which the subsequent portion to the stop position A2 is changed are decided, the second user selects any of the second route R5 and the plural second routes in which the subsequent portion to the stop position A2 is changed.

Next, the assignment unit 50 assesses whether or not the response that indicates that the second route in which the subsequent portion to the stop position A2 is changed is approved is received from the second apparatus by the decided deadline (step S408). In a case where the response that indicates that the second route in which the subsequent portion to the stop position A2 is changed is approved is received from the second apparatus by the decided deadline (Yes in step S408), the assignment unit 50 assigns the benefit to the close second user (step S409). In this case, the information processing apparatus 10 transmits the notification that indicates the benefit is assigned to the second apparatus. Accordingly, the close second user may recognize that the benefit is assigned.

Then, the route calculation unit 30 settles the route to the second desired stop position Bib (step S410). In a case where the second route in which the subsequent portion to the stop position A2 is changed is approved by the deadline, the second route in which the subsequent portion to the stop position A2 is changed is settled as the traveling route. In a case where the second route in which the subsequent portion to the stop position A2 is changed is not approved by the deadline, the route that reaches the second desired stop position B1$b$ via the second route R5 is settled as the traveling route.

As described in the above, in a case where plural second users are present, the second acquisition unit 22 acquires the tolerable range information that indicates the range of the gap from the second desired stop position B1$a$, which is tolerated by the second user, among the plural second users, for whom the second desired stop position is close to the first desired stop position A1. The range of the gap includes a range which is walkable for the second user, for example. The second decision unit 32 decides the second route in which the subsequent portion to the stop position A2 is changed based also on the tolerable range information of the close second user, which is acquired by the second acquisition unit 22. The apparatus communication unit 40 transmits the inquiry of whether the second route in which the subsequent portion to the stop position A2 is changed is approved to the second apparatus that is controlled by the close second user. Then, the assignment unit 50 assigns the benefit to the close second user in response to reception of the response that indicates that the second route in which the subsequent portion to the stop position A2 is changed is approved from the second apparatus. Accordingly, the desired stop position B1$a$ of the second user for whom the second desired stop position is close to the first desired stop position A1 is also changed, and the path to the desired stop position B1b of the other second user for whom the second desired stop position is far from the first desired stop position A1 is thereby shortened. Consequently, even in a case where plural second users are present, the running efficiency of the passenger transportation vehicle may be enhanced.

Note that in a case where plural second users are present after the response that indicates that the second route R5 is approved is received from the first apparatus 100, the information processing apparatus 10 does not transmit the inquiry of whether the second route is approved to the first apparatus 100. For example, in a case where the first user again receives the inquiry about the route change despite the fact that the first user once approves the second route R5, the first user may feel a repeated inquiry to be troublesome. However, because the inquiry about the route change is not again made to the first user after the first user once approves the second route R5, this may prevent the first user from feeling trouble.

[2-3. Third Embodiment]

Next, a third embodiment will be described with reference to FIG. 14 to FIG. 17. Note that in the third embodiment, a description will be made about an action of the information processing apparatus 10 in a case where plural second users make the vehicle allocation requests after the first user makes the vehicle allocation request and before the second route is approved by the first user.

Figure 14:
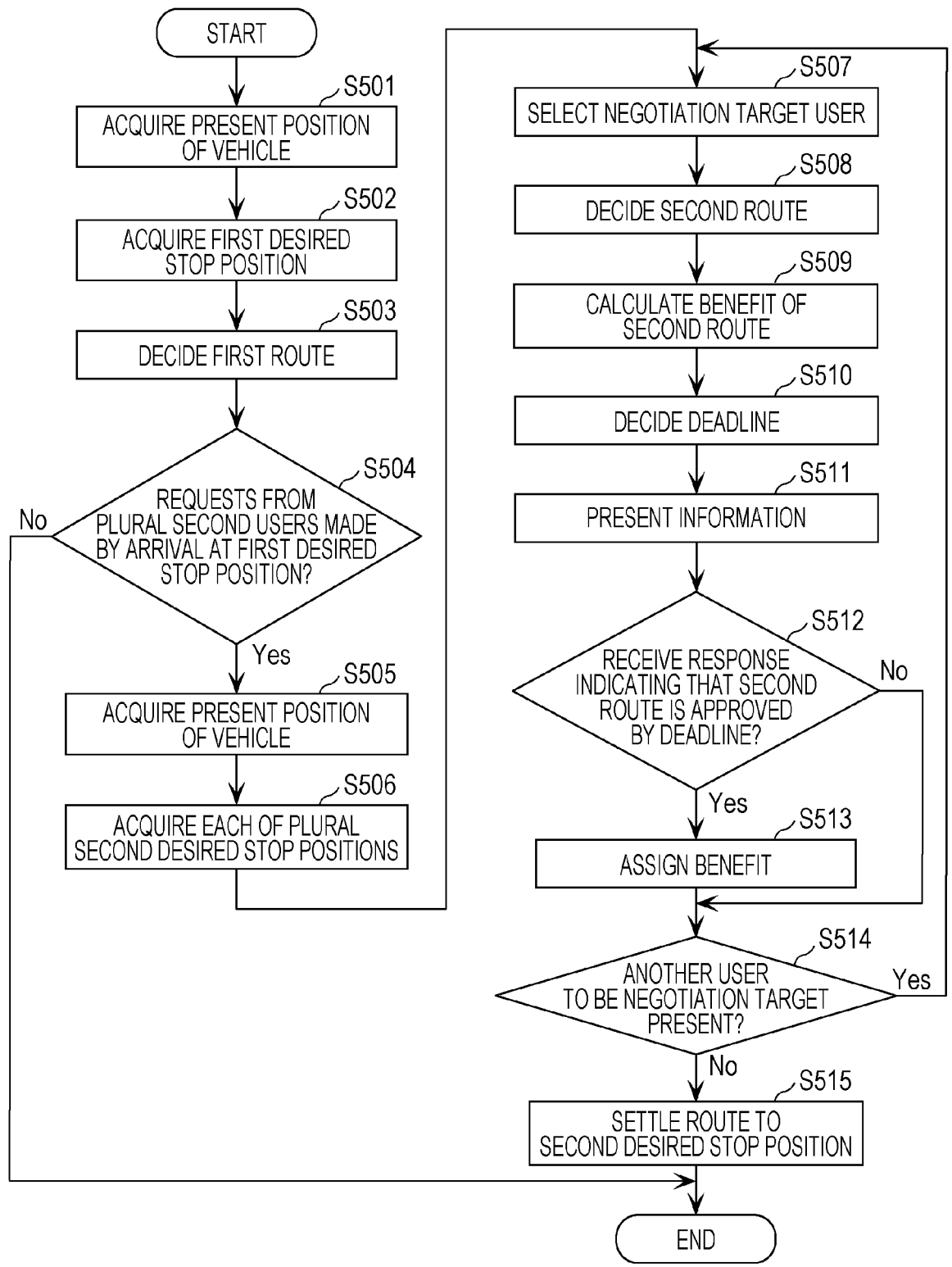
FIG. 14 is a flowchart that illustrates one example of an action of the information processing apparatus in a third embodiment.

FIG. 14 is a flowchart that illustrates one example of an action of the information processing apparatus 10 in the third embodiment. A process from step S501 is started by reception of the request for vehicle allocation of the passenger transportation vehicle from the first user by the information processing apparatus 10, for example.

First, the vehicle position acquisition unit 70 acquires the present position of the vehicle (step S501).

Figure 15:
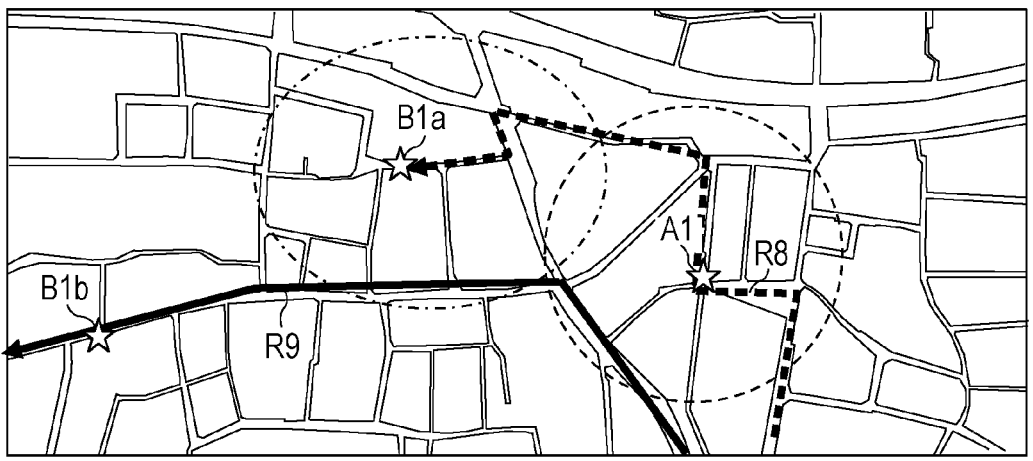
FIG. 15 is a diagram for explaining the second route in the third embodiment.

Next, the first acquisition unit 21 acquires the first desired stop position (step S502). FIG. 15 is a diagram for explaining the second route in the third embodiment. The first desired stop position A1 that is designated by the first user is indicated in FIG. 15. In this case, the first acquisition unit 21 acquires the range of the gap (also referred to as tolerable range) from the first desired stop position A1, which is tolerated by the first user. A broken line circle is indicated as the tolerable range in FIG. 15.

Next, the first decision unit 31 decides the first route of the vehicle based on the first stop position information (step S503). Specifically, the first decision unit 31 decides the first route of the vehicle based on the present position of the vehicle and the first stop position information. The first route is the route to the first desired stop position A1 in a route R8 indicated in FIG. 15.

Then, the vehicle travels on the first route toward the first desired stop position A1.

Next, the information processing apparatus 10 assesses whether or not plural second user make the requests for vehicle allocation by the arrival of the vehicle at the first desired stop position A1 (step S504). Note that the case where plural second users make the requests for vehicle allocation by the arrival of the vehicle at the first desired stop position A1 means a case where a certain second user makes the request for vehicle allocation and another second user thereafter makes the vehicle allocation request before the first user approves the second route in response to the request or a case where plural second users almost simultaneously make the requests for vehicle allocation by the arrival of the vehicle at the first desired stop position A1, for example. Note that in the second embodiment, a description is made about the action of the information processing apparatus 10 in a case where a certain second user makes the request for vehicle allocation, the first user thereafter approves the second route in response to the request, and the other second user thereafter makes the vehicle allocation request.

In a case where plural second users do not make the requests for vehicle allocation by the arrival of the vehicle at the first desired stop position A1 (No in step S504), the vehicle stops for riding or getting-off of the first user at the first desired stop position A1.

In a case where plural second users make the requests for vehicle allocation by the arrival of the vehicle at the first desired stop position A1 (Yes in step S504), the vehicle position acquisition unit 70 acquires the present positions of the vehicle at the times when the requests are accepted (step S505). Note that here, it is assumed that as the plural second users, two second users make the vehicle allocation requests.

Next, the second acquisition unit 22 acquires each of the second desired stop positions of the plural second users (step S506). As illustrated in FIG. 15, the second acquisition unit 22 acquires the second desired stop positions B1a and B1b, for example. In this case, the second acquisition unit 22 acquires the ranges of the gaps (also referred to as tolerable range) from the second desired stop positions, which are respectively tolerated by the plural second users. The tolerable range from the second desired stop position B1a is indicated by a one-dot chain line circle in FIG. 15.

Note that because the second desired stop position B1a is closer to the first desired stop position A1 than the second desired stop position B1b, in the following, the second user whose desired stop position is the second desired stop position B1a will be referred to as close second user, and the second user whose desired stop position is the second desired stop position B1b will be referred to as far second user.

Next, the information processing apparatus 10 selects the user to be a target of negotiation for the route change (step S507). Specifically, the information processing apparatus 10 sequentially selects the user as a negotiation target from the user whose desired stop position is closer to the present position. That is, the first user whose desired stop position is the first desired stop position A1 which is closest to the present position is first selected. The close second user is next selected.

Next, the second decision unit 32 decides the second route based on the tolerable range information of the first user, the tolerable range information of the close second user, and second stop position information of the far second user (step S508). A decided second route R9 is indicated in FIG. 15. The second route R9 is the route, whose distance (path) is shorter than the route which reaches the second desired stop position B1b via the first desired stop position A1 and the second desired stop position B1a, and is the route, in which the vehicle passes a region within the tolerable range of the first user, thereafter passes a region within the tolerable range of the close second user, and reaches the second desired stop position B1b. Note that plural second routes may be decided.

Next, the route calculation unit 30 calculates the benefit of the second route R9 for the first user (step S509).

Figure 16:
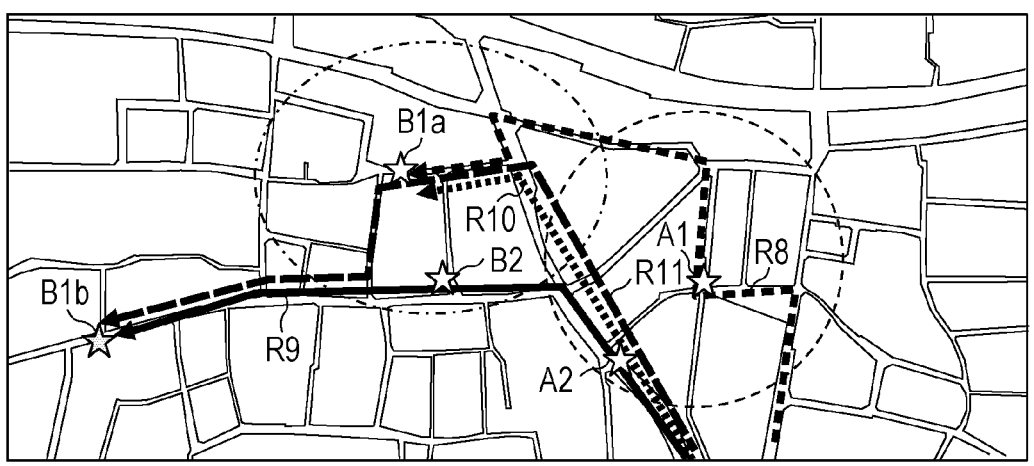
FIG. 16 is a diagram for explaining one example of a calculation method of the benefit in the third embodiment.

FIG. 16 is a diagram for explaining one example of a calculation method of the benefit in the third embodiment.

First, the route calculation unit 30 calculates the route R8 that reaches the second desired stop position B1a via the first desired stop position A1. Next, the route calculation unit 30 calculates a route R10 in which the vehicle passes a region within the tolerable range of the first user and reaches the second desired stop position B1a. Then, the route calculation unit 30 calculates the benefit that corresponds to the difference between the distance of the route R8 and the distance of the route R10. That is, the benefit is the benefit that corresponds to the difference between the route, in which the vehicle travels via the desired stop position (here, the first desired stop position A1) of the user who gains the benefit (here, the first user) and reaches the next desired stop position (here, the second desired stop position B1a) which is close to the desired stop position, and the route, in which the vehicle passes a region within the tolerable range of the user who gains the benefit and reaches the next desired stop position which is close to the desired stop position of the user who gains the benefit.

Next, the route calculation unit 30 decides the deadline in a case where the first user is caused to select whether the vehicle travels on the first route (the route to the first desired stop position A1 in the route R8) without any change or travels on the second route R9 (step S510).

Next, the apparatus communication unit 40 transmits the information about whether the second route R9 is approved to the first apparatus 100 and causes the first apparatus 100 to present the information (step S511). For example, the apparatus communication unit 40 transmits the information about which of the first route and the second route R9 is selected to the first apparatus 100 and causes the first apparatus 100 to present the information.

Next, the assignment unit 50 assesses whether or not the response that indicates that the second route R9 is approved is received from the first apparatus 100 by the decided deadline (step S512). In a case where the response that indicates that the second route R9 is approved (for example, selection of the stop position A2) is received from the first apparatus 100 by the decided deadline (Yes in step S512), the assignment unit 50 assigns the benefit to the first user (step S513).

Next, the information processing apparatus 10 assesses whether or not another user to be the target of negotiation for the route change is present (step S514).

As described above, because the information processing apparatus 10 sequentially selects the user as the negotiation target from the user whose desired stop position is closer to the present position, in a case where the other user as the negotiation target is present (Yes in step S514), processes from step S507 to step S513 are performed for the user selected as the negotiation target.

Consequently, next, the information processing apparatus 10 selects the close second user as the user to be the target of negotiation for the route change (step S507).

Note that the action of the information processing apparatus 10 for the second user changes between a case where the first user approves the second route R9 and a case where the first user does not approve the second route R9. Thus, a description will first be made about a case where the first user approves the second route R9.

The second decision unit 32 decides the second route based on the result of the negotiation with the first user, the tolerable range information of the close second user, and the second stop position information of the far second user (step S508). Also for the close second user, the second decision unit 32 decides the second route R9.

Next, the route calculation unit 30 calculates the benefit of the second route R9 for the close second user (step S509).

First, the route calculation unit 30 calculates a route R11 that reaches the second desired stop position B1b via the route R10 in which the vehicle passes a region within the tolerable range of the first user and reaches the second desired stop position B1a. Then, the route calculation unit 30 calculates the benefit that corresponds to the difference between the distance of the route R11 and the distance of the second route R9. That is, the benefit is the benefit that corresponds to the difference between the route, in which the vehicle passes a region within the tolerable range of the user previously selected as the negotiation target (here, the first user), travels via the desired stop position (here, the second desired stop position B1a) of the user who gains the benefit (here, the close second user), and reaches the next desired stop position (here, the second desired stop position B1b) which is close to the desired stop position of the user who gains the benefit, and the route, in which the vehicle passes a region within the tolerable range of the user previously selected as the negotiation target, passes a region within the tolerable range of the user who gains the benefit, and reaches the next desired stop position which is close to the desired stop position of the user who gains the benefit.

Next, the route calculation unit 30 decides the deadline in a case where the close second user is caused to select whether the vehicle travels on the route R10 without any change or travels on the second route R9 (step S510).

Next, the apparatus communication unit 40 transmits the information about whether the second route R9 is approved to the second apparatus and causes the second apparatus to present the information (step S511). For example, the apparatus communication unit 40 transmits the information about which of the route R10 and the second route R9 is selected to the second apparatus and causes the second apparatus to present the information.

Next, the assignment unit 50 assesses whether or not the response that indicates that the second route R9 is approved is received from the second apparatus by the decided deadline (step S512). In a case where the response that indicates that the second route R9 is approved (for example, selection of the stop position B2) is received from the second apparatus by the decided deadline (Yes in step S512), the assignment unit 50 assigns the benefit to the close second user (step S513).

Next, a description will be made about a case where the first user does not approve the second route R9.

Figure 17:
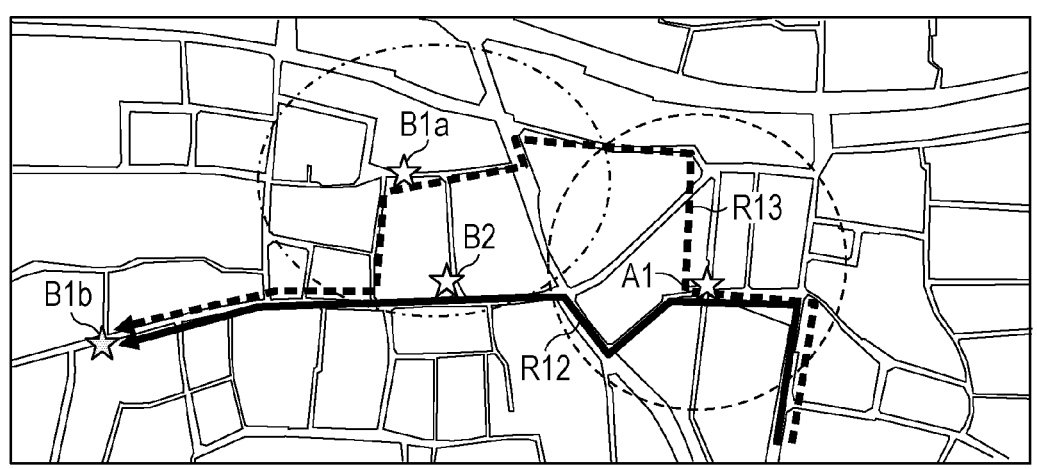
FIG. 17 is a diagram for explaining another example of the calculation method of the benefit in the third embodiment.

FIG. 17 is a diagram for explaining another example of the calculation method of the benefit in the third embodiment.

The second decision unit 32 decides the second route based on the result of the negotiation with the first user, the tolerable range information of the close second user, and the second stop position information of the far second user (step S508). A decided second route R12 is indicated in FIG. 17. The second route R12 is the route, whose distance (path) is shorter than the route which reaches the second desired stop position B1b via the first desired stop position A1 and the second desired stop position B1a, and is the route, in which the vehicle passes the first desired stop position A1, thereafter passes a region within the tolerable range of the close second user, and reaches the second desired stop position B1b. This is because the first user does not select the second route R9, that is, the first user selects a stop at the first desired stop position A1, and the vehicle thus has to pass the first desired stop position A1.

Next, the route calculation unit 30 calculates the benefit of the second route R12 for the close second user (step S509).

The route calculation unit 30 calculates the benefit that corresponds to the difference between the distance of a route R13 and the distance of the second route R12. That is, the benefit is the benefit that corresponds to the difference between the route, in which the vehicle passes the desired stop position (here, the first desired stop position A1) of the user previously selected as the negotiation target (here, the first user), travels via the desired stop position (here, the second desired stop position B1a) of the user who gains the benefit (here, the close second user), and reaches the next desired stop position (here, the second desired stop position B1b) which is close to the desired stop position of the user who gains the benefit, and the route, in which the vehicle passes the desired stop position of the user previously selected as the negotiation target, passes a region within the tolerable range of the user who gains the benefit, and reaches the next desired stop position which is close to the desired stop position of the user who gains the benefit.

Next, the route calculation unit 30 decides the deadline in a case where the close second user is caused to select whether the vehicle travels on the route R8 (the route to the second desired stop position B1a in the route R13) without any change or travels on the second route R12 (step S510).

Next, the apparatus communication unit 40 transmits the information about whether the second route R12 is approved to the second apparatus and causes the second apparatus to present the information (step S511). For example, the apparatus communication unit 40 transmits the information about which of the route R8 and the second route R12 is selected to the second apparatus and causes the second apparatus to present the information.

Next, the assignment unit 50 assesses whether or not the response that indicates that the second route R12 is approved is received from the second apparatus by the decided deadline (step S512). In a case where the response that indicates that the second route R12 is approved (for example, selection of the stop position B2) is received from the second apparatus by the decided deadline (Yes in step S512), the assignment unit 50 assigns the benefit to the close second user (step S513).

In such a manner, the contents of negotiation with and the benefit to the close second user change in accordance with the result of the negotiation with the first user.

Further, in a case where no other user as the negotiation target is present (No in step S514), the route calculation unit 30 settles the route to the second desired stop position B1b (step S515). In a case where each of the first user and the second user approves the second route, the route to the second desired stop position B1b is settled as the second route R9. In a case where the first user approves the second route but the second user does not approve the second route, the route to the second desired stop position B1b is settled as the route R11. In a case where the first user does not approve the second route but the second user approves the second route, the route to the second desired stop position B1b is settled as the second route R12. In a case where neither the first user nor the second user approves the second route, the route to the second desired stop position B1b is settled as the route R13.

As described in the above, in a case where plural second users are present before the response that indicates that the second route is approved is received from the first apparatus 100, the user as the negotiation target is sequentially selected from the user whose desired stop position is closer to the present position. Then, the route is decided in accordance with the result of negotiation with each of the users, and the benefit that corresponds to the shortened distance is assigned to the user who accepts the shortening of the route. Accordingly, because the route may be shortened by each of the users as the negotiation targets, even in a case where plural second users are present, the running efficiency of the passenger transportation vehicle may be enhanced.

(Other Embodiments)

In the foregoing, a description has been made about the information processing system 1 and the information processing apparatus 10 of the present disclosure based on the embodiments. However, the present disclosure is not limited to the above embodiments. Modes in which various kinds of modifications conceived by persons having ordinary skill in the art are applied to the embodiments and modes that are configured by combining configuration elements in different embodiments may be included in the scope of the present disclosure unless the modes depart from the gist of the present disclosure.

For example, in the above embodiments, the information processing system 1 is applied to the passenger transportation vehicle. However, for example, the information processing system 1 may be applied to a moving body that transports a cargo. The moving body may include an autonomous flying apparatus such as a drone, for example.

Further, for example, a specifying method of the vehicle which the user rides is not particularly limited. However, the number of the license plate of the vehicle may be notified to the user, or arrival may be notified to the user in a case where the vehicle approaches the user.

Further, in the above embodiments, a description is made about a configuration in which the benefit is assigned to the user in a case where the user approves the second route. However, a cost may be assigned to the user in a case where the user does not approve the second route. For example, the assigned cost may be an increase in the fare. Further, the assignment of the cost may be reduction in the benefit. For example, the assignment of the cost may be reduction in the discount of the fare, reduction in the assigned points, or the like.

Further, the present disclosure not only may be realized as the information processing apparatus 10 but also may be realized as a method that includes respective steps (processes) performed by the configuration elements which configure the information processing apparatus 10.

Specifically, as illustrated in FIG. 2, in an information processing method, a computer is used to acquire the first stop position information that indicates the first desired stop position for riding or getting-off of the first user who rides the vehicle and the tolerable range information that indicates the range of the gap from the first desired stop position, which is tolerated by the first user, (step S101) and to acquire the second stop position information that indicates the second desired stop position for riding or getting-off of the second user who rides the vehicle (step S102). In the information processing method, the second route is decided based on the first stop position information, the tolerable range information, and the second stop position information (step S103). Then, in the information processing method, the inquiry of whether the second route is approved is transmitted to the first apparatus that is controlled by the first user (step S104), and the benefit is assigned to the first user in response to reception of the response that indicates that the second route is approved from the first apparatus, or the cost is assigned to the first user in response to reception of the response that indicates that the second route is not approved from the first apparatus (step S105).

Further, for example, those steps may be executed by a computer (computer system). Further, the present disclosure may realize those steps included in the method as a program to be executed by a computer. In addition, the present disclosure may be realized as a non-transitory computer-readable recording medium that stores the program such as a CD-ROM.

For example, in a case where the present disclosure is realized by a program (software), hardware resources such as a CPU, a memory, and an input-output circuit of the computer are used to execute the program, and the steps are thereby executed. That is, the CPU acquires data from the memory, the input-output circuit, or the like to perform computation and outputs computation results to the memory, the input-output circuit, or the like, and the steps are thereby executed.

Further, the plural configuration elements included in the information processing apparatus 10 of the above embodiments may respectively be realized as dedicated or general-purpose circuits. Those configuration elements may be realized as one circuit or may be realized as plural circuits.

Further, the plural configuration elements included in the information processing apparatus 10 of the above embodiments may be realized as a large scale integration (LSI) that is an integrated circuit (IC). Those configuration elements may each be formed into one individual chip or may be formed into one chip that includes a portion or all of those. The LSI may be referred to as system LSI, super LSI, or ultra LSI in accordance with the difference in the degree of integration.

Further, the integrated circuit is not limited to an LSI but may be realized as a dedicated circuit or a general-purpose processor. A field programmable gate array (FPGA), which is programmable, or a reconfigurable processor, in which connection and settings of circuit cells inside the LSI are reconfigurable, may be used.

In addition, modes in which various kinds of modifications conceived by persons having ordinary skill in the art are applied to the embodiments and modes that are realized by arbitrarily combining configuration elements and functions in the embodiments in the scope that does not depart from the gist of the present disclosure are included in the present disclosure.

What is claimed is:

1. An information processing method for an information processing system for performing allocation of a vehicle comprising:
  acquiring, from a first user mobile device of a first user having a touch screen displaying a graphical user interface and acquiring the present position thereof using a global positioning system, first stop position information that indicates a first desired stop position for the first user to enter or exit the vehicle and tolerable range information that indicates a distance from the first desired stop position that is tolerable for the first user to traverse;
  determining a first route for the vehicle based on the acquired first stop position information;
  acquiring, from a second user mobile device of a second user having a touch screen displaying a graphical user interface and acquiring the present position thereof using the global positioning system, second stop position information that indicates a second desired stop position for the second user to enter or exit the vehicle;
  determining a second route based on the first stop position information, the tolerable range information of the first user, and the second stop position information;
  transmitting to the first user mobile device an inquiry requesting input of a selection on the graphical user interface displayed on the touch screen that the second route is approved or that the second route is disapproved; and
  receiving a notification representing the input of the selection on the graphical user interface displayed on the touch screen of the first user mobile device, wherein the graphical user interface displayed on the touch screen is configured to receive the selection that the second route is approved or that the second route is disapproved,
  in a case where plural second users including the second user are present and the second user's second desired stop position is closer to the first desired stop position than second desired stop positions of the other second users of the plural second users,
    acquiring tolerable range information that indicates a distance from the second desired stop position that is tolerable for the second user to traverse; and
    determining the second route based also on the acquired tolerable range information of the second user; and
  transmitting an inquiry to the second user mobile device asking whether the determined second route is approved or disapproved.

2. The information processing method according to claim 1, wherein an approval for the second route includes selection from plural second routes.

3. The information processing method according to claim 2, wherein the selection of the second route includes selection of a position on the second route.

4. The information processing method according to claim 1, wherein
  the first desired stop position is a position associated with the first user exiting the vehicle, and
  the second desired stop position is a position associated with the second user entering the vehicle.

5. The information processing method according to claim 1, wherein
  the first desired stop position is a position associated with the first user exiting the vehicle, and
  the second desired stop position is a position associated with the second user exiting the vehicle.

6. The information processing method according to claim 1, wherein
  the first desired stop position is a position associated with the first user entering the vehicle, and
  the second desired stop position is a position associated with the second user entering the vehicle.

7. The information processing method according to claim 1, wherein
  the first desired stop position is a position associated with the first user entering the vehicle, and
  the second desired stop position is a position associated with the second user exiting the vehicle.

8. The information processing method according to claim 1, wherein
  the first route reaches the first desired stop position,
  the second route passes through a predetermined area around the first desired stop position within the distance of the tolerable range information and reaches the second desired stop position, and
  the notification including a predetermined positive value and a predetermined negative value each corresponding to a difference between i) a distance of a route in which the vehicle passes the first route and subsequently reaches the second desired stop position, and ii) a distance of the second route.

9. The information processing method according to claim 1, further comprising:
transmitting a signal to the first user mobile device representing a notification that indicates the assigning of a predetermined positive or negative value.

10. The information processing method according to claim 1, wherein in a case where the information processing system performs allocation of the vehicle among the plural second users after receipt of approval of the second route from the first user mobile device, a notification requesting input of a selection that the second route is approved or that the second route is not disapproved is not transmitted to the apparatus.

11. The information processing method according to claim 1, wherein the distance of the tolerable range information corresponds to a distance input into the information processing apparatus by the first user that is walkable by the first user to or from the first desired stop position of the vehicle.

12. The information processing method according to claim 1, wherein
the notification further includes information about an assigned predetermined positive or negative value which is assigned by approving or disapproving of the second route, and
the first user mobile device apparatus is caused to present the assigned, predetermined positive or negative value.

13. The information processing method according to claim 1, wherein
the transmitting operation further transmits information that indicates the second route, and
the first user mobile device is further caused to present the second route.

14. The information processing method according to claim 13, wherein
the transmitting operation further transmits information that indicates the first route which is determined based on the first stop position information, and
the first user mobile device is further caused to present the first route together with the second route.

15. The information processing method according to claim 14, wherein
the first route and the second route are displayed on the touch screen of the first user mobile device, and
the method further comprises generating a response that indicates that the second route is approved in a case where the second route is displayed on the touch screen of the first user mobile device and touched on the touch screen of the first user mobile device, and generating a response indicating that the second route is not approved in a case where the first route is displayed on the touch screen of the first user mobile device and touched.

16. An information processing system for performing allocation of a vehicle comprising:
an information processing apparatus; and
a first user mobile device of a first user having a touch screen displaying a graphical user interface and acquiring the present position thereof using a global positioning system, which communicates with the information processing apparatus,
the information processing apparatus comprising:
a processor; and
a memory storing thereon a computer program, which when executed by the processor, causes the processor to perform operations including:
acquiring from the first user mobile device first stop position information that indicates a first desired stop position for the first user to enter or exit the vehicle and tolerable range information that indicates a distance from the first desired stop position that is tolerable for the first user to traverse;
determining a first route for the vehicle based on the acquired first stop position information;
acquiring, from a second user mobile device of a second user having a touch screen displaying a graphical user interface and acquiring the present position thereof using the global positioning system, second stop position information that indicates a second desired stop position for the second user to enter or exit the vehicle;
determining a second route based on the first stop position information, the tolerable range information of the first user, and the second stop position information;
transmitting to the first user mobile device an inquiry requesting input of a selection on the graphical user interface displayed on the touch screen that the second route is approved or that the second route is disapproved; and
receiving a notification representing the input of the selection on the graphical user interface displayed on the touch screen of the first user mobile device, wherein the graphical user interface displayed on the touch screen is configured to receive the selection that the second route is approved or that the second route is disapproved,
in a case where plural second users including the second user are present and the second user's second desired stop position is closer to the first desired stop position than second desired stop positions of the other second users of the plural second users,
acquiring tolerable range information that indicates a distance from the second desired stop position that is tolerable for the second user to traverse; and
determining the second route based also on the acquired tolerable range information of the second user; and
transmitting an inquiry to the second user mobile device asking whether the determined second route is approved or disapproved.

17. A non-transitory recording medium storing thereon a computer program instructing the execution of the method of:
acquiring from a first user mobile device of a first user having a touch screen displaying as graphical user interface and acquiring the present position thereof using a global positioning system, first stop position information that indicates a first desired stop position for the first user to enter or exit the vehicle and tolerable range information that indicates a distance from the first desired stop position that is tolerable for the first user to traverse;
determining a first route for the vehicle based on the acquired first stop position information;
acquiring, from a second user mobile device of a second user having a touch screen displaying a graphical user interface and acquiring the present position thereof using the global positioning system, second stop position information that indicates a second desired stop position for the second user to enter or exit the vehicle;

determining a second route based on the first stop position information, the predetermined area, the tolerable range information of the first user, and the second stop position information;

transmitting to the first user mobile device an inquiry requesting input of a selection on the graphical user interface displayed on the touch screen that the second route is approved or that the second route is disapproved; and receiving a notification representing the input of the selection on the graphical user interface displayed on the touch screen of the first user mobile device, wherein the graphical user interface displayed on the touch screen is configured to receive the selection that the second route is approved or that the second route is disapproved, in a case where plural second users including the second user are present and the second user's second desired stop position is closer to the first desired stop position than second desired stop positions of the other second users of the plural second users, acquiring tolerable range information that indicates a distance from the second desired stop position that is tolerable for the second user to traverse; and determining the second route based also on the acquired tolerable range information of the second user; and transmitting an inquiry to the second user mobile device asking whether the determined second route is approved or disapproved.

\* \* \* \* \*